(12) United States Patent
Goto et al.

(10) Patent No.: US 8,555,303 B2
(45) Date of Patent: Oct. 8, 2013

(54) DISK CARTRIDGE

(75) Inventors: Naofumi Goto, Kanagawa (JP); Takeshi Kubo, Kanagawa (JP); Takeharu Takasawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 65 days.

(21) Appl. No.: 13/108,264

(22) Filed: May 16, 2011

(65) Prior Publication Data

US 2011/0296451 A1    Dec. 1, 2011

(30) Foreign Application Priority Data

May 25, 2010 (JP) ................................. 2010-119651

(51) Int. Cl.
*G11B 21/08* (2006.01)
*G11B 7/085* (2006.01)
*G11B 23/03* (2006.01)

(52) U.S. Cl.
USPC ....................................... 720/735; 369/30.65

(58) Field of Classification Search
USPC ............ 369/30.4, 30.41, 30.49, 30.51–30.54, 369/30.65, 30.66, 30.68, 30.69, 30.76, 30.77, 369/30.83; 720/725, 728, 732, 734, 735
See application file for complete search history.

(56) References Cited

U.S. PATENT DOCUMENTS

| | | | | |
|---|---|---|---|---|
| 4,701,900 A | * | 10/1987 | Hasegawa et al. | 369/30.84 |
| 5,046,059 A | * | 9/1991 | Yoshida et al. | 369/30.89 |
| 5,936,935 A | * | 8/1999 | Hanakawa et al. | 720/732 |
| 7,159,229 B2 | | 1/2007 | Inoue et al. | |
| 7,533,397 B2 | | 5/2009 | Ohgi | |
| 2001/0046104 A1 | * | 11/2001 | Inoue et al. | 360/133 |
| 2002/0084372 A1 | * | 7/2002 | Hayashi | 242/348 |
| 2003/0112740 A1 | * | 6/2003 | Takizawa et al. | 369/291 |
| 2003/0124754 A1 | * | 7/2003 | Farahi et al. | 438/29 |
| 2005/0210497 A1 | * | 9/2005 | Oishi et al. | 720/741 |
| 2006/0044686 A1 | * | 3/2006 | Oishi | 360/133 |
| 2006/0168596 A1 | * | 7/2006 | Funawatari et al. | 720/600 |
| 2009/0125933 A1 | * | 5/2009 | Takizawa et al. | 720/728 |
| 2011/0119691 A1 | | 5/2011 | Goto et al. | |
| 2011/0119693 A1 | * | 5/2011 | Takasawa et al. | 720/732 |
| 2011/0225602 A1 | | 9/2011 | Kubo et al. | |
| 2011/0296449 A1 | | 12/2011 | Goto et al. | |
| 2011/0296450 A1 | | 12/2011 | Goto et al. | |

FOREIGN PATENT DOCUMENTS

JP          63-029392          2/1988

* cited by examiner

*Primary Examiner* — Wayne Young
*Assistant Examiner* — Adam B Dravininkas
(74) *Attorney, Agent, or Firm* — Wolf, Greenfield & Sacks, P.C.

(57) ABSTRACT

A disk cartridge includes a case body that is capable of housing a plurality of disk-shaped recording media and is joined or separated by making a first shell contact with/separate from a second shell in an axial direction, and a lock lever that is rotatably supported and locks the first shell and the second shell in a joining manner, in the inside of the case body. A supporting shaft is provided to the case body, the lock lever includes a supported part and a lock part, a disk inserting/ejecting slot is formed, an open/close panel is provided to the first shell, the lock lever is supported on an end part of the case body, and an insertion concave part in which the lock part of the lock lever can be inserted and engaged is formed within an inner face of the open/close panel.

11 Claims, 26 Drawing Sheets

DISK CARTRIDGE

BACKGROUND OF THE INVENTION

1. Field of the Invention

The present invention relates to a technical field of a disk cartridge. In particular, the present invention relates to a technical field in which an insertion concave part in which a lock part of a lock lever can be inserted and engaged is formed within an inner face of an open/close panel so as to prevent damage of a supporting shaft which supports the lock lever.

2. Description of the Related Art

There is a disk cartridge in which a plurality of disk-shaped recording media can be housed in a manner to be arranged in an axial direction of a central axis. Such disk cartridge is used in a disk reproduction device for music reproduction, for example. In the disk reproduction device, a desired disk-shaped recording medium is taken out by a take-out mechanism and music from music data which is recorded in the disk-shaped recording medium is performed (for example, refer to Japanese Unexamined Patent Application Publication No. 63-29392).

Further, as storage capacity of a disk-shaped recording medium has been dramatically increased in recent years, necessity of such disk cartridge has been increasing that can house a plurality of disk-shaped recording media having large storage capacity in a manner to arrange them in an axial direction of a central axis and is used in a data center or the like.

Some disk cartridges such as that described above house disk-shaped recording media in such manner that each of outer circumferential parts of the disk-shaped recording media is inserted into a pair of holding grooves. This type of disk cartridge does not use a disk tray which holds disk-shaped recording media, so that housing space is small and therefore the size of the disk cartridge can be reduced. In addition, housing number of disk-shaped recording media can be increased and thus an amount of data which is stored can be increased.

Further, practical use of a disk cartridge that includes a case body including a first shell and a second shell, which can be separated from each other, and a rotatable lock lever has been considered. In terms of this disk cartridge, disk-shaped recording media are housed in and taken out from the case body in a separate state of the first shell and the second shell, and the first shell and the second shell are locked by the rotatable lock lever in a joining state of the first shell and the second shell.

SUMMARY OF THE INVENTION

However, in a disk cartridge including a rotatable lock lever as described above, when large shock is applied to a case body, for example, when the disk cartridge is accidentally dropped, a large load is given to a supporting shaft which supports the lock lever due to the shock and therefore the supporting shaft may be damaged.

If the supporting shaft is damaged, the lock lever may be dropped from the case body and therefore the lock of a first shell and a second shell may be released. Accordingly, disk-shaped recording media housed inside may be damaged or the disk-shaped recording media may be popped out from the case body, and thereby storage of data may be adversely affected.

It is desirable to provide a disk cartridge that prevents damage of a supporting shaft which supports a lock lever and thus prevents a defect occurrence when a shock is applied thereto.

According to an embodiment of the present invention, there is provided a disk cartridge including a case body that is capable of housing a plurality of disk-shaped recording media in an inside thereof in a manner to arrange the disk-shaped recording media in an axial direction of a central axis, and that is joined or separated by making a first shell, which includes a base face that is parallel to a recording face of the disk-shaped recording media, contact with/separate from a second shell, which includes a base plate that is parallel to the recording face of the disk-shaped recording media, in the axial direction, and a lock lever that is rotatably supported within a face orthogonal to the axial direction and locks the first shell and the second shell in a joining manner, in the inside of the case body. In the disk cartridge, a supporting shaft which serves as a rotation fulcrum of the lock lever is provided to the case body, the lock lever includes a supported part that is supported by the supporting shaft and a lock part that is protruded from the supported part and locks the first shell and the second shell, a disk inserting/ejecting slot into or from which the disk-shaped recording media are inserted or ejected with respect to the case body when the first shell and the second shell are separated from each other is formed, an open/close panel that opens/closes the disk inserting/ejecting slot is provided to the first shell, the lock lever is supported on an end part, which is at an open/close panel side, of the case body, and an insertion concave part in which the lock part of the lock lever can be inserted and engaged is formed within an inner face of the open/close panel.

Accordingly, in the disk cartridge, when shock is applied to the case body, the lock lever receives a load through the open/close panel.

In the disk cartridge of the embodiment, it is preferable that the lock lever be rotatably supported on the first shell, a pair of lateral faces that are orthogonal to the base plate, are protruded from respective end parts of the base plate in a same direction as each other, and are positioned to be opposed to each other be provided to the second shell, a plurality of holding grooves into which each of outer circumferential parts of the disk-shaped recording media is inserted so that the disk-shaped recording media are held be formed within inner faces of the pair of lateral faces, and a locking concave part that is engaged with the lock part of the lock lever so as to lock the first shell and the second shell be formed on end parts, which are at the open/close panel side, of the lateral faces.

Thanks to such configuration that the pair of lateral faces is provided to the second shell, further, the plurality of holding grooves are formed on the inner faces of the pair of lateral faces, and the locking concave part is formed on the end part at the open/close panel side, the width of the locking concave part of the second shell in the direction in which the disk-shaped recording media are inserted is reduced.

In the disk cartridge of the embodiment, it is preferable that the supporting shaft be provided to be protruded from the base face of the first shell, an energizing spring that energizes the lock lever in a rotating direction in which the lock part is engaged with the locking concave part be provided, a torsion coil spring that is composed of a coil part and a pair of arm parts, which are stuck out from the coil part, be used as the energizing spring, a spring hook protrusion part on which one of the arm parts of the energizing spring is engaged and supported be provided on the base face of the first shell, a spring supporting protrusion part on which the other of the arm parts of the energizing spring is engaged and supported be provided on the lock lever, the spring supporting protrusion part be protruded toward the base face of the first shell from the lock part, and the coil part of the energizing spring be supported on an end part, which is at a base face side, of the supporting shaft.

Thanks to such configuration that the spring hook protrusion part on which one of the arm parts of the energizing spring is engaged and supported is provided on the base face of the first shell, further, the spring supporting protrusion part on which the other of the arm parts of the energizing spring is engaged and supported is provided on the lock lever, and the coil part of the energizing spring is supported on the end part, which is at the base face side, of the supporting shaft, all parts of the energizing spring are arranged along the base face.

In the disk cartridge of the embodiment, it is preferable that the open/close panel be provided with an attached protrusion part that is protruded from the inner face thereof, and the attached protrusion part be attached to one end part in the axial direction of the supporting shaft.

Thanks to such configuration that the open/close panel is provided with the attached protrusion part which is protruded from the inner face thereof and the attached protrusion part is attached to one end part in the axial direction of the supporting shaft, the supporting shaft is reinforced by the attached part.

In the disk cartridge of the embodiment, it is preferable that the attached protrusion part of the open/close panel be positioned so as to be opposed to and close to the lock lever.

Thanks to such configuration that the attached protrusion part of the open/close panel is positioned to be opposed to and close to the lock lever, movement of the lock lever in the axial direction of the supporting shaft is regulated by the attached part.

A disk cartridge according to an embodiment of the present invention includes a case body that is capable of housing a plurality of disk-shaped recording media in an inside thereof in a manner to arrange the disk-shaped recording media in an axial direction of a central axis, and that is joined or separated by making a first shell, which includes a base face that is parallel to a recording face of the disk-shaped recording media, contact with/separate from a second shell, which includes a base plate that is parallel to the recording face of the disk-shaped recording media, in the axial direction, and a lock lever that is rotatably supported within a face orthogonal to the axial direction and locks the first shell and the second shell in a joining manner, in the inside of the case body. In the disk cartridge, a supporting shaft which serves as a rotation fulcrum of the lock lever is provided to the case body, the lock lever includes a supported part that is supported by the supporting shaft and a lock part that is protruded from the supported part and locks the first shell and the second shell, a disk inserting/ejecting slot into or from which the disk-shaped recording media are inserted or ejected with respect to the case body when the first shell and the second shell are separated from each other is formed, an open/close panel that opens/closes the disk inserting/ejecting slot is provided to the first shell, the lock lever is supported on an end part, which is at an open/close panel side, of the case body, and an insertion concave part in which the lock part of the lock lever can be inserted and engaged is formed within an inner face of the open/close panel.

Accordingly, when shock is applied to the case body, movement of the lock part is regulated by the insertion concave part. Therefore, inclination of the lock lever hardly occurs and damage of the supporting shaft is prevented, being able to favorably maintain data recorded in the disk-shaped recording media.

In another embodiment of the present invention, the lock lever is rotatably supported on the first shell, a pair of lateral faces that are orthogonal to the base plate, are protruded from respective end parts of the base plate in a same direction as each other, and are positioned to be opposed to each other is provided to the second shell, a plurality of holding grooves into which each of outer circumferential parts of the disk-shaped recording media is inserted so that the disk-shaped recording media are held are formed within inner faces of the pair of lateral faces, and a locking concave part that is engaged with the lock part of the lock lever so as to lock the first shell and the second shell is formed on end parts, which are at the open/close panel side, of the lateral faces.

Accordingly, the width of the locking concave part of the second shell in the direction in which the disk-shaped recording media are inserted is reduced, being able to prevent the disk-shaped recording media from dropping off when the disk-shaped recording media are inserted into or ejected from the disk inserting/ejecting slot.

In still another embodiment of the present invention, the supporting shaft is provided to be protruded from the base face of the first shell, an energizing spring that energizes the lock lever in a rotating direction in which the lock part is engaged with the locking concave part is provided, a torsion coil spring that is composed of a coil part and a pair of arm parts, which are stuck out from the coil part, is used as the energizing spring, a spring hook protrusion part on which one of the arm parts of the energizing spring is engaged and supported is provided on the base face of the first shell, a spring supporting protrusion part on which the other of the arm parts of the energizing spring is engaged and supported is provided on the lock lever, the spring supporting protrusion part is protruded toward the base face of the first shell from the lock part, and the coil part of the energizing spring is supported on an end part, which is at a base face side, of the supporting shaft.

Thus, all parts of the energizing spring are arranged along the base face, so that the space of the inside of the case body is effectively used and accordingly the size of the case body can be reduced.

In yet another embodiment of the present invention, the open/close panel is provided with an attached protrusion part that is protruded from the inner face thereof, and the attached protrusion part is attached to one end part in the axial direction of the supporting shaft.

Accordingly, inclination of the supporting shaft can be prevented by the attached protrusion part.

In yet another embodiment of the present invention, the attached protrusion part of the open/close panel is positioned so as to be opposed to and close to the lock lever.

Accordingly, the lock lever and the energizing spring can be prevented from dropping from the supporting shaft and movement of the lock lever in the axial direction of the supporting shaft can be regulated so as to optimize the rotating operation of the lock lever.

DESCRIPTION OF THE PREFERRED EMBODIMENTS

Figure 1:
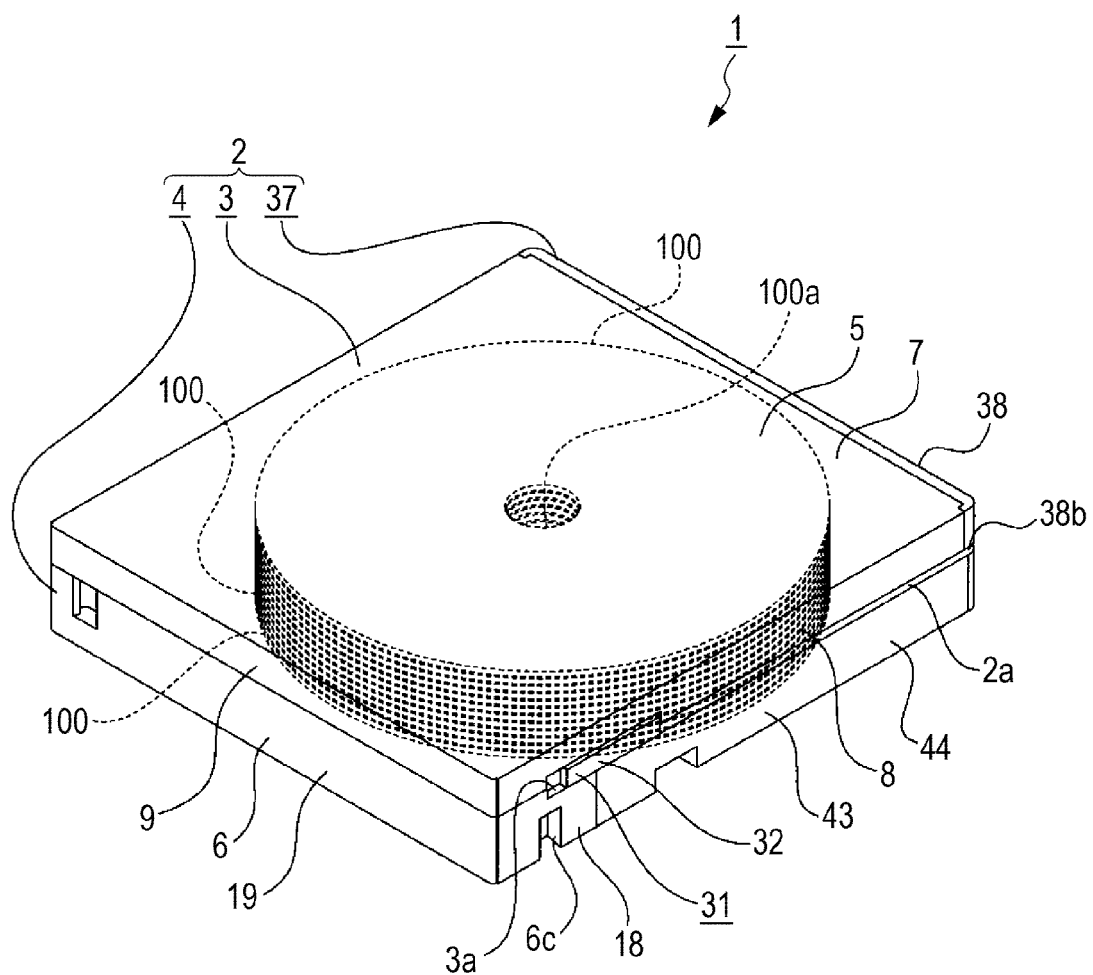
FIG. 1 is a perspective view which shows a disk cartridge according to an embodiment of the present invention together with FIGS. 2 to 30.

A disk cartridge according to an embodiment of the present invention is described below with reference to the accompanying drawings.

In the following description, front, rear, upper, lower, right, and left directions are shown on the condition that a direction in which a disk cartridge is inserted from a cartridge inserting/ejecting port of a disk changer is set to be front.

Here, it should be noted that the front, rear, upper, lower, right, and left directions shown in the following description are for the sake of convenience in the explanation, and directions are not limited to these directions concerning embodiments of the present invention.

[Whole Configuration]

A disk cartridge 1 is formed such that respective main elements are arranged in the inside of a case body 2 which includes a first shell 3 and a second shell 4. In the inside of the case body 2, a plurality of disk-shaped recording media 100, 100, . . . can be housed in a vertical direction at regular intervals.

Figure 2:
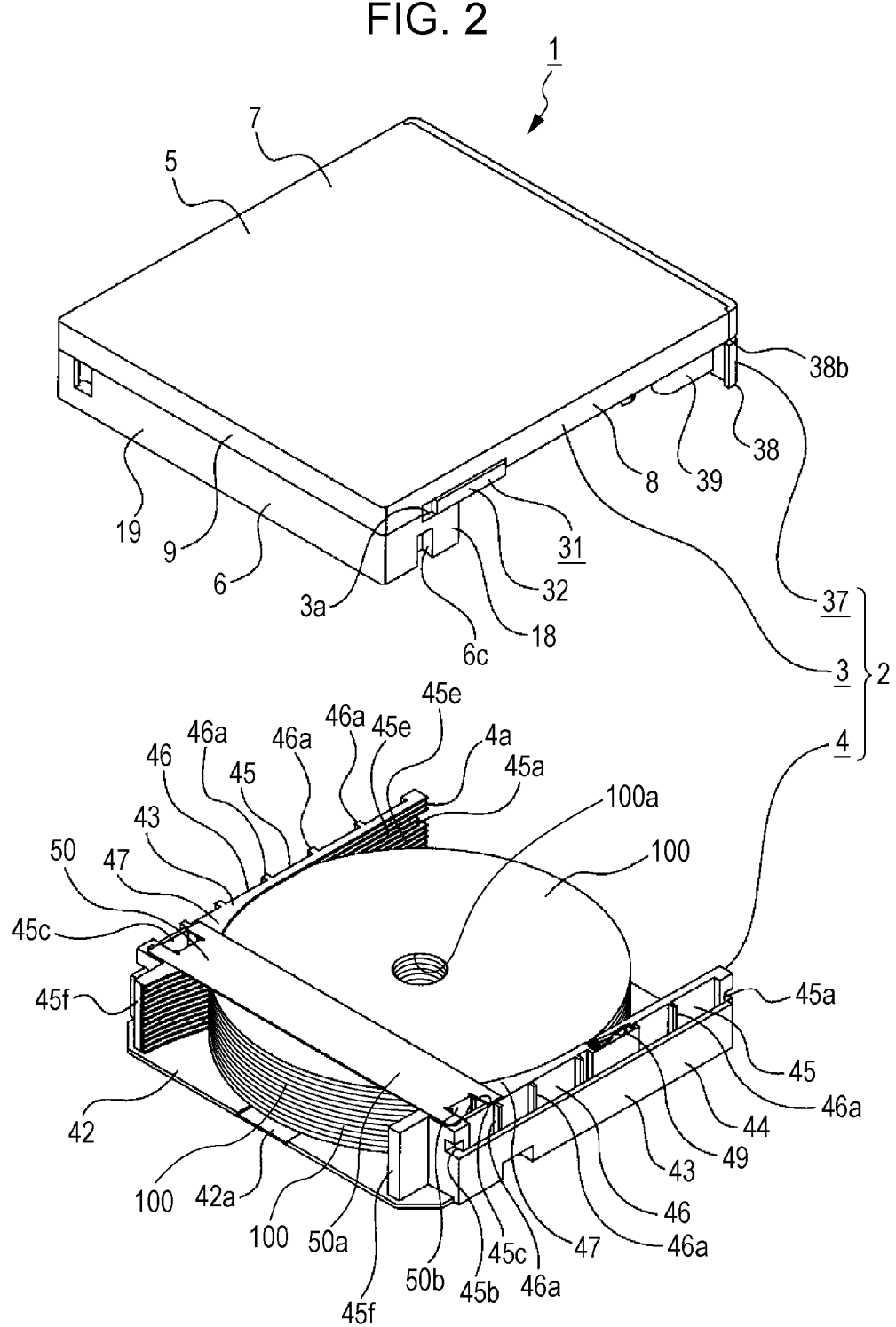
FIG. 2 is a perspective view showing the disk cartridge which is in a state that a first shell and a second shell are separated from each other.
Figure 3:
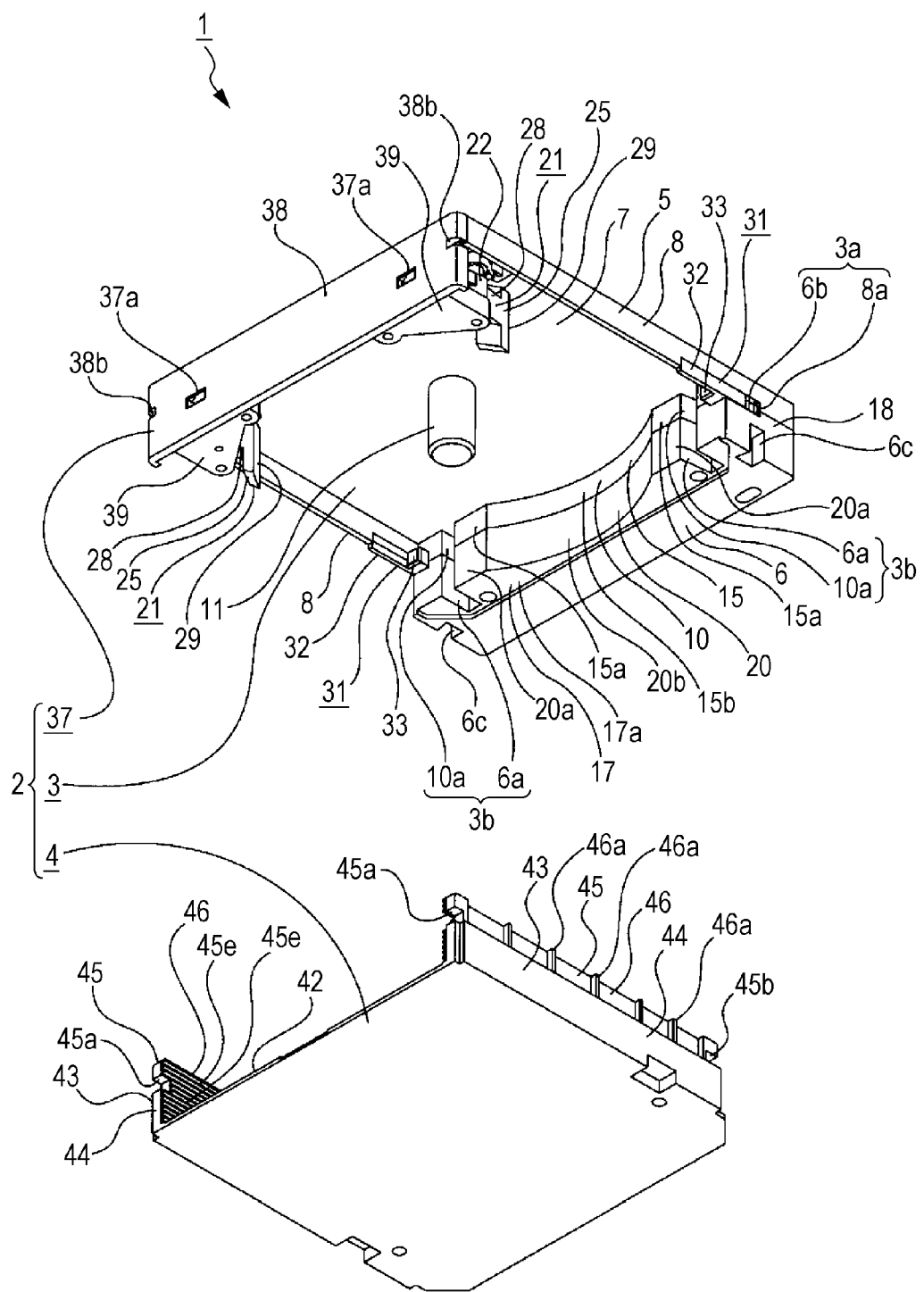
FIG. 3 is a perspective view showing the disk cartridge which is viewed from a different direction from FIG. 2 and is in the state that the first shell and the second shell are separated from each other.

The first shell 3 and the second shell 4 are set such that they can be joined to or separated from each other in the vertical direction, for example (refer to FIGS. 1 to 3). Here, in a case where the case body 2 is formed to be vertically long, the first shell 3 and the second shell 4 are joined to or separated from each other in the right-left direction.

The first shell 3 is made of a resin material and is formed by joining a base body 5 and an auxiliary base 6, which is attached to a rear end part of the base body 5, in the vertical direction.

Figure 4:
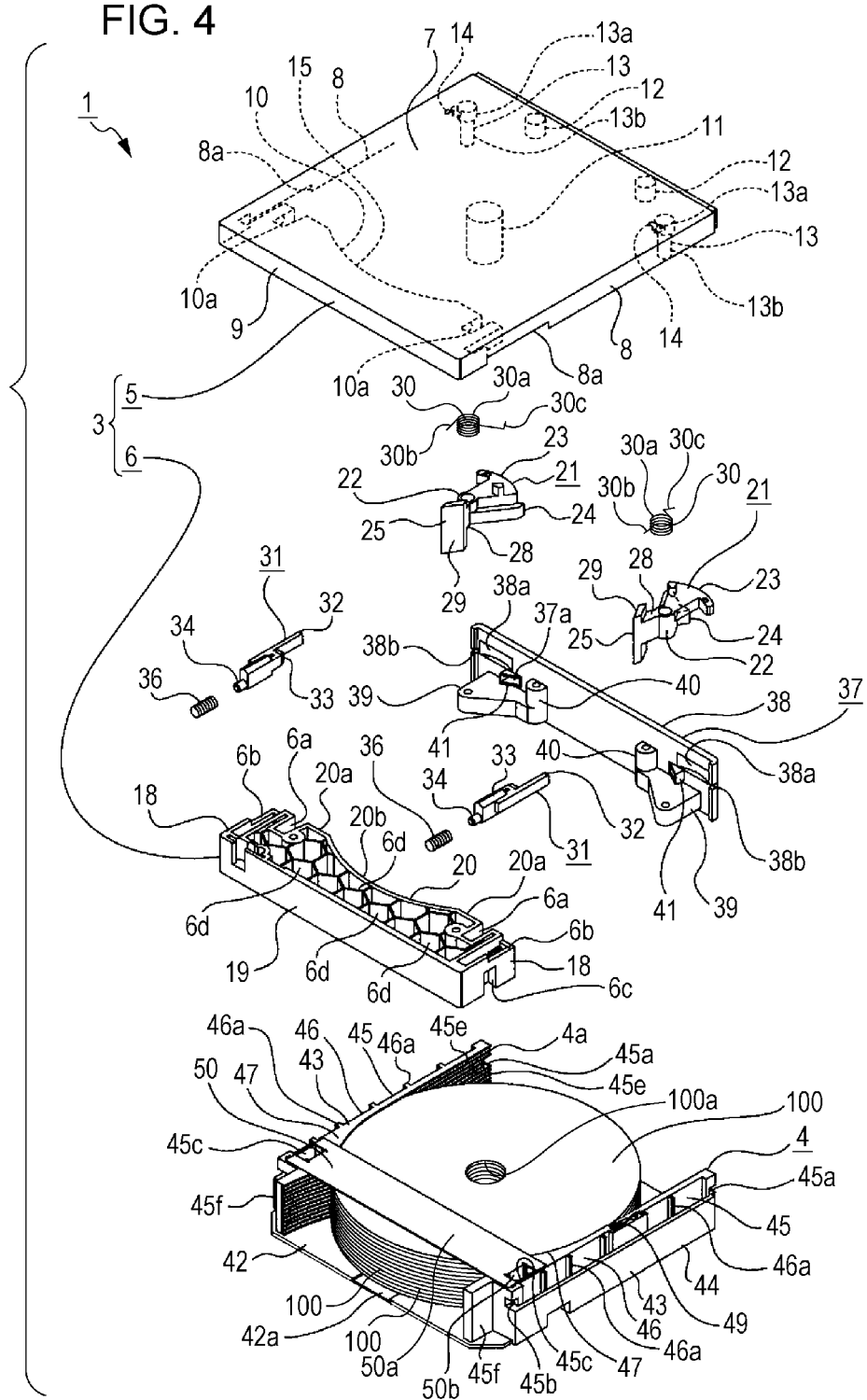
FIG. 4 is an exploded perspective view of the disk cartridge.
Figure 5:
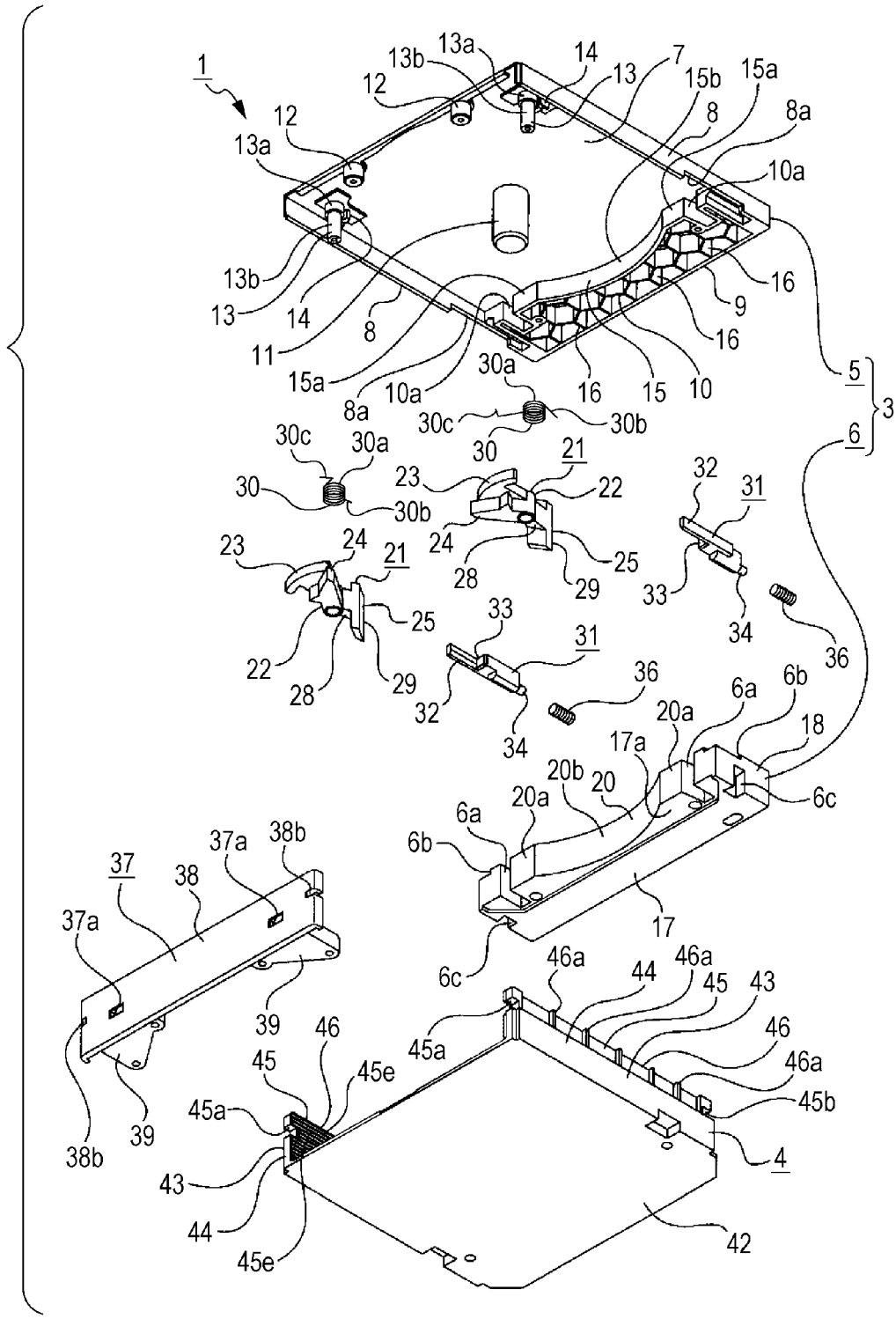
FIG. 5 is an exploded perspective view of the disk cartridge which is viewed from a different direction from FIG. 4.

The base body 5 includes a base face 7, side faces 8 and 8, a rear face 9, and a reinforcing part 10, as shown in FIGS. 4 and 5. The base face 7 faces the vertical direction. The side faces 8 and 8 are respectively protruded downward from right and left end parts of the base face 7. The rear face 9 is protruded downward from a rear end part of the base face 7. The reinforcing part 10 is provided on a rear end part which is on a lower face side of the base face 7.

On the central part of the base face 7, a center pin 11 which is protruded downward and has a round shaft shape is provided. On a front end part of the base face 7, screwing bosses 12 and 12 which are protruded downward are provided with an interval in right and left.

On positions close to the front end of the base face 7, supporting shafts 13 and 13 which are protruded downward are provided with an interval in right and left. The supporting shafts 13 and 13 include spring supporting parts 13a and 13a on their respective upper end parts and lever supporting parts 13b and 13b, of which a diameter is smaller than that of the spring supporting parts 13a and 13a, at parts other than the upper end parts. On positions close to the supporting shafts 13 and 13 on the lower face of the base face 7, spring hook protrusion parts 14 and 14 are respectively provided.

On positions close to rear end sides of the side faces 8 and 8, supporting concave parts 8a and 8a which are opened downward are respectively formed.

The reinforcing part 10 includes an external wall 15 and a plurality of partition walls 16, 16, . . . , and is opened downward. The external wall 15 is positioned on a front side and faces a horizontal direction. The plurality of partition walls 16, 16, . . . are provided in a region surrounded by the external wall 15, the rear end parts of the side faces 8 and 8, and the rear face 9. The partition walls 16, 16, . . . are provided such that respective end parts thereof are continuously formed to be connected with the base face 7, the side faces 8 and 8, the rear face 9, or the external wall 15.

The external wall 15 includes flat surface parts 15a and 15a which face front, at right and left end parts thereof and a regulation part 15b which is formed to have a gradual circular-arc shape which is concaved rearward, at a part between the flat surface parts 15a and 15a. The curve rate of the regulation part 15b is set to be same as that of an outer circumferential face of the disk-shaped recording medium 100.

On the reinforcing part 10, concave parts 10a and 10a which are opened frontward and downward are formed at both right and left sides of the regulation part 15b.

The partition walls 16, 16, . . . are formed to have a regular hexagon shape or a shape of a part of the regular hexagon, for example. However, the shape of the partition walls 16, 16, . . . is not limited to the regular hexagon or the shape of a part of the regular hexagon, and an arbitrary shape may be employed as long as the partition walls 16, 16, . . . make spaces therewithin.

The auxiliary base 6 includes a bottom face plate 17, lateral face plates 18 and 18, a rear face plate 19, and a front face plate 20, and is opened upward. The bottom face plate 17 is horizontally long. The lateral face plates 18 and 18 are protruded upward respectively from right and left ends of the bottom face plate 17. The rear face plate 19 is protruded upward from a rear end part of the bottom face plate 17. The front face plate 20 is protruded upward from a front end part of the bottom face plate 17. The auxiliary base 6 functions as a reinforcing part which reinforces the first shell 3 so as to enhance the strength of the first shell 3 as is the case with the reinforcing part 10.

On a lower face side of the rear end part of the bottom face plate 17, a shallow concave part 17a is formed.

The front face plate 20 includes flat surface parts 20a and 20a which face front, at right and left end parts thereof and a regulation part 20b which is formed to have a gradual circular-arc shape which is concaved rearward, at a part between the flat surface parts 20a and 20a. The front face plate 20 is formed to have the same size and shape as those of the external wall 15 of the reinforcing part 10 provided on the base body 5 of the first shell 3.

On the auxiliary base 6, concave parts 6a and 6a which are opened frontward and upward are respectively formed on right and left sides of the regulation part 20b. On the right and left end parts of the auxiliary base 6, supporting concave parts 6b and 6b which are opened upward are respectively formed. On lower end parts on right and left end parts of the auxiliary base 6, grip parts 6c and 6c which are opened laterally and downward are respectively formed.

In the inside of the auxiliary base 6, a plurality of partition walls 6d, 6d, . . . are provided. The partition walls 6d, 6d, . . . are continuously provided to be connected with the bottom face plate 17, the lateral face plates 18 and 18, the rear face plate 19, and the front face plate 20, and are formed to have the same size and shape as those of the partition walls 16, 16, . . . of the reinforcing part 10.

The auxiliary base 6 is attached to the base body 5 by screwing or the like. In a state that the auxiliary base 6 is attached to the base body 5, the partition walls 16, 16, . . . and the partition walls 6d, 6d, . . . are overlapped so as to form a plurality of spaces therewithin. The supporting concave parts 8a and 8a of the base body 5 and the supporting concave parts 6b and 6b of the auxiliary base 6 are positioned to respectively correspond vertically to each other and thus slider supporting parts 3a and 3a are respectively formed (refer to FIGS. 2 and 3). Further, the concave parts 10a and 10a of the base body 5 and the concave parts 6a and 6a of the auxiliary base 6 are positioned to respectively correspond vertically to each other and thus insertion concave parts 3b and 3b are respectively formed. Furthermore, the external wall 15 of the base body 5 and the front face plate 20 of the auxiliary base 6 are overlapped.

Lock levers 21 and 21 are rotatably supported respectively on the supporting shafts 13 and 13 of the first shell 3 (refer to FIGS. 3 to 5).

Figure 6:
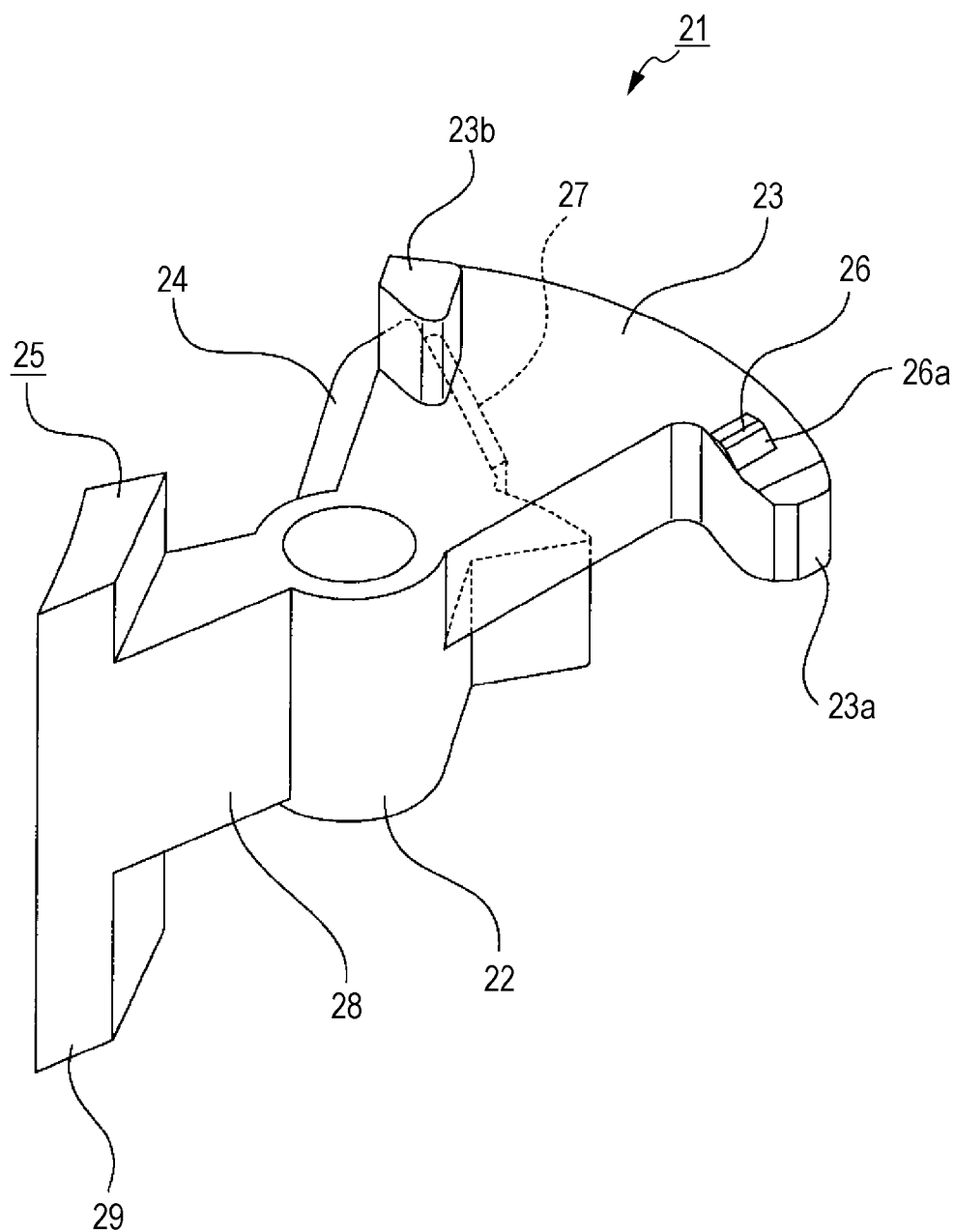
FIG. 6 is an enlarged perspective view of a lock lever.
Figure 7:
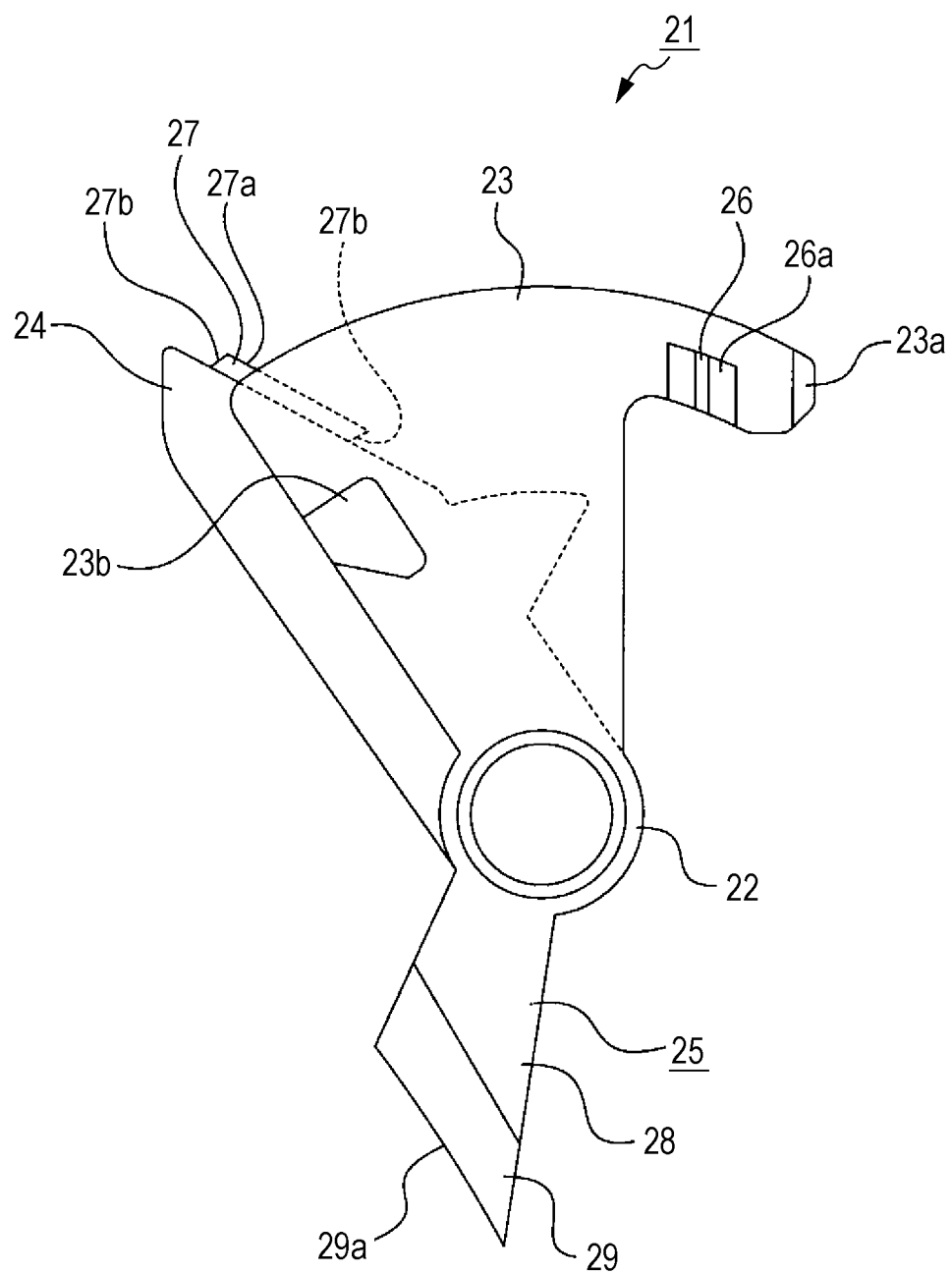
FIG. 7 is an enlarged plan view of the lock lever.

The lock lever 21 includes a supported part 22, a lock part 23, a lock-release part 24, and a balance part 25 as shown in FIGS. 6 and 7. The supported part 22 has a cylindrical shape and is supported by inserting the supporting shaft 13 therein. The lock part 23 is protruded approximately frontward from an approximate upper half part of the supported part 22. The lock-release part 24 is protruded diagonally frontward from an approximate lower half part of the supported part 22. The balance part 25 is protruded approximate rearward from the supported part 22.

The lock part 23 has an outer circumferential face (a front-side face) which is formed in a circular-arc surface shape centered on the central axis of the supported part 22, and the lock part 23 includes a locking protrusion part 23a which is protruded laterally, at the end part thereof. The locking protrusion part 23a is formed to have a taper shape of which an outer shape becomes smaller toward the end part. A protrusion part 26 which is protruded upward is provided on an upper face of the locking protrusion part 23a of the lock part 23. The protrusion part 26 has a slide contact face 26a which is inclined so as to be displaced upward with distance from the end part of the locking protrusion part 23a.

To the lock part 23, a spring supporting protrusion part 23b which is protruded upward is provided.

To the end part of the lock-release part 24, an insertion protrusion part 27 is provided. The insertion protrusion part 27 is formed to have an approximate plate shape which is horizontally long, and the end face of the insertion protrusion part 27 is formed as an inclined face 27a which is inclined in the right-left direction with respect to the front-back direction. Right and left lateral faces 27b and 27b of the insertion protrusion part 27 are respectively formed in a circular-arc surface shape centered on the central axis of the supported part 22.

The balance part 25 includes a protrusion part 28 which is protruded rearward from the supported part 22 and a regulation protrusion part 29 which is protruded upward and downward from an end part of the protrusion part 28. The rear face of the regulation protrusion part 29 is formed as a regulation face 29a which is formed in a circular-arc surface shape which follows the outer circumferential face of the disk-shaped recording medium 100.

Figure 8:
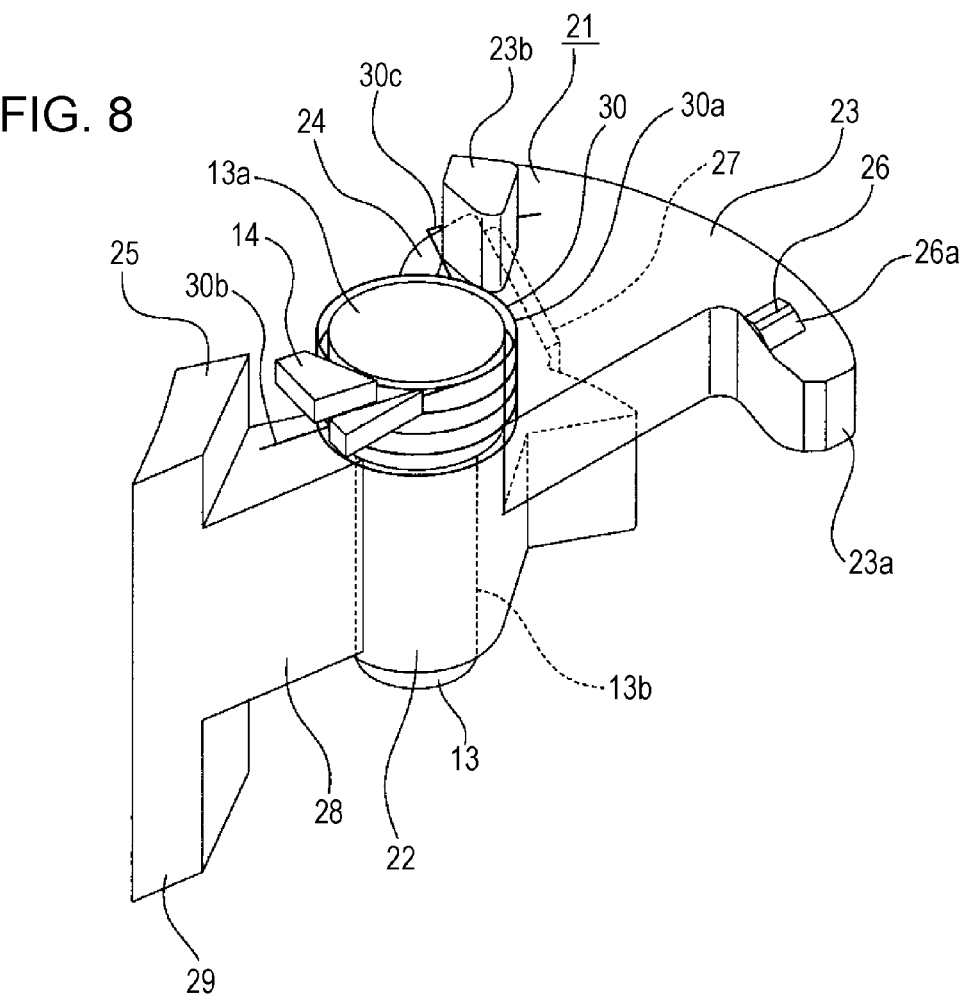
FIG. 8 is an enlarged perspective view showing the lock lever, which is supported by a supporting shaft, and an energizing spring.

The lock levers 21 and 21 are set to be rotatable around respective central axes of the supporting shafts 13 and 13 by inserting the lever supporting parts 13b and 13b of the supporting shafts 13 and 13 respectively into the supported parts 22 and 22 (refer to FIG. 8). In a state that the lock levers 21 and 21 are respectively supported by the supporting shafts 13 and 13, the lock levers 21 and 21 are energized by energizing springs 30 and 30 in a direction in which the locking protrusion parts 23a and 23a of the lock parts 23 and 23 respectively approach the side faces 8 and 8.

The energizing spring 30 is a torsion coil spring, for example, and includes a coil part 30a and a pair of arm parts 30b and 30c which are respectively stuck out from the coil part 30a. Concerning the energizing spring 30, the coil part 30a is supported by the spring supporting part 13a of the supporting shaft 13, one arm part 30b is engaged with the spring hook protrusion part 14 which is provided on the base face 7 of the first shell 3, and the other arm part 30c is engaged with the spring supporting protrusion part 23b which is provided on the lock part 23 of the lock lever 21.

Lock sliders 31 and 31 are respectively supported by the slider supporting parts 3a and 3a of the first shell 3 slidably in the front-back direction (refer to FIGS. 3 to 5).

Figure 9:
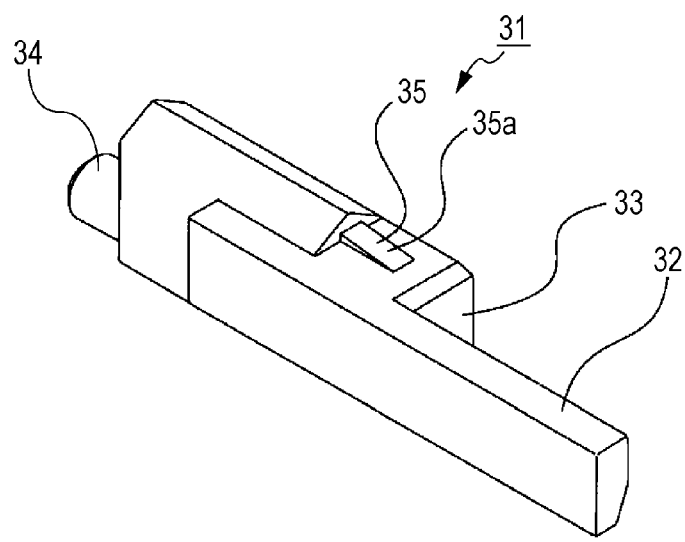
FIG. 9 is an enlarged perspective view of a lock slider.

As shown in FIG. 9, the lock slider 31 includes a supported part 32 which extends frontward and rearward, a lock part 33 which is protruded inward from a part other than the front end part of the supported part 32, and a spring supporting shaft part 34 which is protruded rearward from the rear face of the lock part 33. To a part of the upper face which is positioned closer to the front end of the lock part 33, a protrusion part 35 which is protruded upward is provided. The protrusion part 35 includes a slide contact face 35a which is inclined so as to be displaced upward as it extends rearward.

The supported parts 32 and 32 of the lock sliders 31 and 31 are slidably supported at the slider supporting parts 3a and 3a of the first shell 3 respectively, and coil springs 36 and 36 are respectively supported by the spring supporting shaft parts 34 and 34 of the lock sliders 31 and 31. The coil spring 36 contacts with the rear face of the lock part 33 and the rear face of the slider supporting part 3a, at both ends thereof. Therefore, the lock slider 31 is energized frontward by the coil spring 36.

To the front end part of the first shell 3, an open/close panel 37 is attached by screwing (refer to FIGS. 1 to 3). As shown in FIGS. 4 and 5, the open/close panel 37 includes a panel part 38, attached protrusion parts 39 and 39, screw parts 40 and 40, and insertion parts 41 and 41. The panel part 38 is formed to have a rectangular plate shape which is horizontally long and to face the front-back direction. The attached protrusion parts 39 and 39 are protruded rearward from a lower end part of the rear face of the panel part 38. The screw parts 40 and 40 are provided on the rear face of the panel part 38. The insertion parts 41 and 41 are protruded rearward from the rear face of the panel part 38.

On the rear face of the panel part 38, insertion concave parts 38a and 38a which are opened rearward are formed in a manner to be separated to right and left. The insertion concave parts 38a and 38a are formed as concave parts having circular-arc shapes. On both right and left end parts of the panel part 38, insertion cutouts 38b and 38b which are opened outward are respectively formed.

The attached protrusion parts 39 and 39 are provided in a manner to be separated to right and left, the screw parts 40 and 40 are provided in a manner to be separated to right and left on inner sides of the attached protrusion parts 39 and 39 respectively, and the insertion parts 41 and 41 are respectively provided on upper sides of the attached protrusion parts 39 and 39.

The insertion part 41 is formed to have a triangle shape when viewed from the vertical direction, and the end face of the insertion part 41 is formed as an inclined face 41a which approaches the panel part 38 as it goes from the outside to the inside.

The open/close panel 37 includes insertion holes 37a and 37a which are formed in a manner to be separated to right and left. The insertion holes 37a and 37a are formed through the panel part 38 and the insertion parts 41 and 41.

Concerning the open/close panel 37, the end parts of the attached protrusion parts 39 and 39 are respectively screwed to the lower faces of the supporting shafts 13 and 13 which are provided to the base face 7, and the screw parts 40 and 40 are respectively screwed to the lower faces of the screwing bosses 12 and 12 which are provided to the base face 7. Thus, the open/close panel 37 is attached to the first shell 3.

In a state that the open/close panel 37 is attached to the first shell 3, the attached protrusion parts 39 and 39 are respectively screwed to lower parts of the supporting shafts 13 and 13, and thus the lock levers 21 and 21 and energizing springs 30 and 30 which are supported by the supporting shafts 13 and 13 are prevented from dropping from the supporting shafts 13 and 13. In the state that the attached protrusion parts 39 and 39 are respectively screwed and attached to the lower parts of the supporting shafts 13 and 13, upper faces of the attached protrusion parts 39 and 39 are positioned close to lower faces of the lock parts 23 and 23 of the lock levers 21 and 21.

In the state that the open/close panel 37 is attached to the first shell 3, the lock-release parts 24 and 24 of the lock levers 21 and 21 are respectively positioned immediately behind the insertion holes 37a and 37a.

Figure 10:
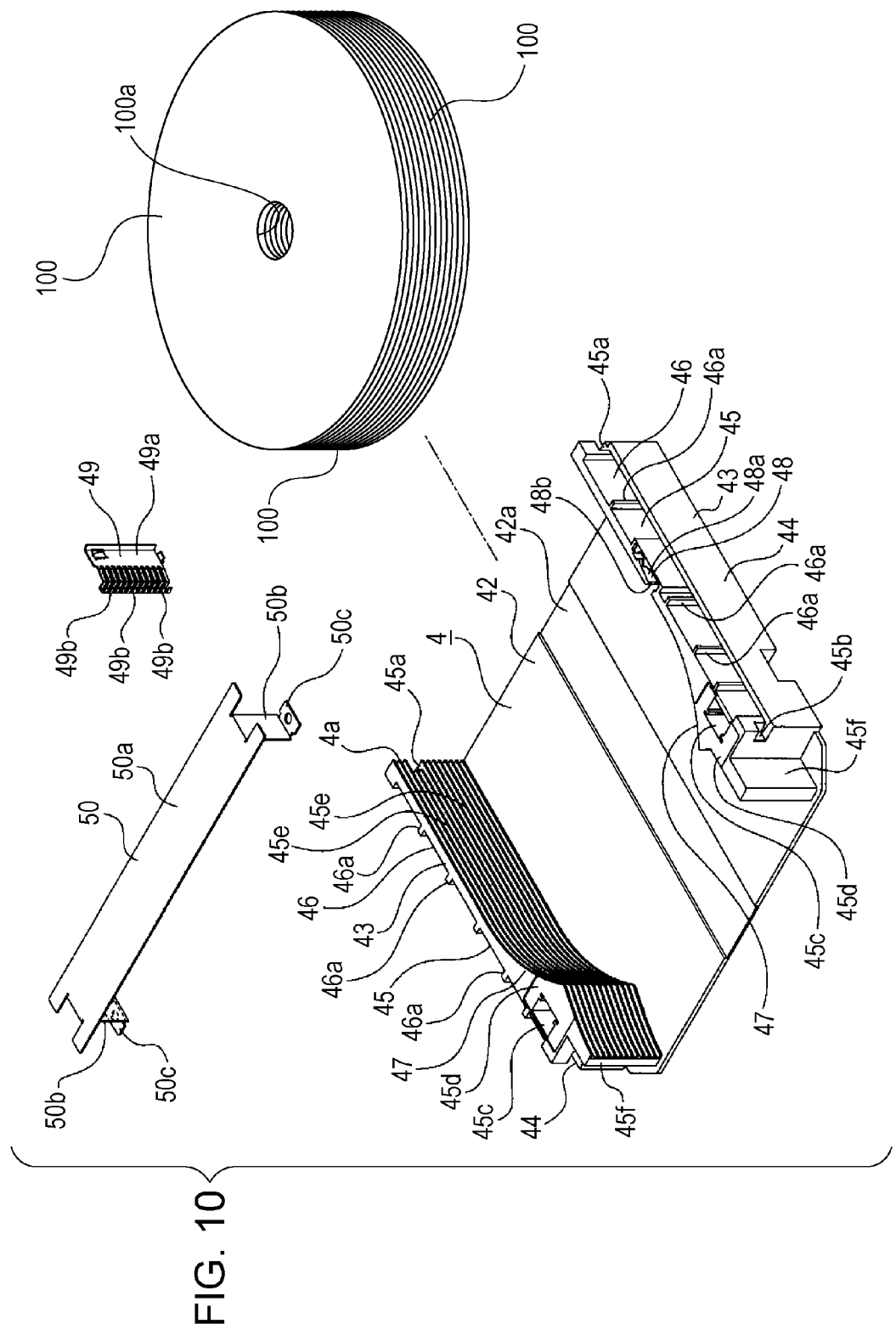
FIG. 10 is an exploded perspective view showing the second shell, a bridge member, a holding spring, and disk-shaped recording media.

The second shell 4 is made of a resin material and is formed by integrating a base plate 42 and lateral faces 43 and 43 (refer to FIGS. 3, 5, and 10). The base plate 42 faces the vertical direction. The lateral faces 43 and 43 are protruded upward respectively from right and left end parts of the base plate 42.

The central part in the right-left direction of the base plate 42 is formed as a thin part 42a which has thickness slightly thinner than other parts. The thin part 42a is formed as a step face which is recessed downward.

The lateral face 43 includes an external wall part 44 and an internal wall part 45 which is positioned on the inner side of the external wall part 44. Between the external wall part 44 and the internal wall part 45, a plurality of regular gaps, which are separated to front and back, are formed.

The height of the external wall part 44 is set to be approximately a half of the height of the internal wall part 45 and therefore the upper face of the external wall part 44 is lower than the upper face of the internal wall part 45.

The internal wall part 45 includes a linear part 46 which extends frontward and rearward, and a circular-arc part 47 which is continuously formed to be connected with a part at a rear end side of the linear part 46 and to have a circular-arc shape which is displaced inward as it goes rearward.

On the front end part of the internal wall part 45, a first locking concave part 45a which is opened frontward and penetrate from right to left is formed. On a position at a rear end side of the linear part 46 of the internal wall part 45, a second locking concave part 45b which is opened rearward and outward is formed.

On the position at the rear end side of the internal wall part 45, an attachment hole 45c which is opened upward is formed. On the upper face of the internal wall part 45, a step face 45d which has slightly lower height than other parts is formed on a peripheral part of the attachment hole 45c.

On the outer face of the linear part 46 of the internal wall part 45, ribs 46a, 46a, . . . which are separated frontward and rearward and extend vertically are provided and the outer faces of the ribs 46a, 46a, . . . are continuously formed to be connected with the inner face of the external wall part 44. The rear end part of the internal wall part 45 is formed as an insertion part 45f which is protruded rearward.

On the inner face of the internal wall part 45, holding grooves 45e, 45e, . . . are formed and the holding grooves 45e, 45e, . . . are positioned in a manner to be separated at regular intervals in the vertical direction.

On one internal wall part 45, a spring attachment concave part 48 is formed. The spring attachment concave part 48 includes an insertion attachment part 48a which is opened upward and a protrusion concave part 48b which is opened upward and to the inner face of the linear part 46 and is communicated with the rear end part of the insertion attachment part 48a.

To the spring attachment part 48, a holding spring 49 is inserted and attached (refer to FIGS. 2 and 4). As shown in FIG. 10, the holding spring 49 includes an attached part 49a and spring parts 49b, 49b, . . . which are made of a metal material and formed in an integrated manner. The attached part 49a has a plate shape which is vertically long. The spring parts 49b, 49b, . . . are stuck out from the rear edge of the attached part 49a. The spring parts 49b, 49b, . . . are provided in a manner to be separated vertically at regular intervals which are the same intervals as the vertical intervals of the holding grooves 45e, 45e, . . . , and the number of the spring parts 49b, 49b, . . . is same as that of the holding grooves 45e, 45e, . . . .

The attached part 49a is inserted into the insertion attachment part 48a and the spring parts 49b, 49b, . . . are inserted into the protrusion concave part 48b, and thus the holding spring 49 is attached to the spring attachment part 48. In the state that the holding spring 49 is attached to the spring attachment part 48, end parts of the spring parts 49b, 49b, . . . are protruded to the inside of the linear part 46.

Between the lateral faces 43 and 43 of the second shell 4, a bridge member 50 is attached (refer to FIGS. 2 and 10).

The bridge member 50 is formed by bending a plate-shape metal material to a predetermined shape and includes a bridging part 50a, bent parts 50b and 50b, and attached face parts 50c and 50c. The bridging part 50a extends to right and left. The bent parts 50b and 50b are respectively formed by bending both right and left end parts of the bridging part 50a downward. The attached face parts 50c and 50c are formed by bending lower ends of the bent parts 50b and 50b outward.

The thickness of the bridging part 50a of the bridge member 50 is set to be same as the depth of the step faces 45d and 45d which are formed on the internal wall parts 45 and 45 of the second shell 4.

Figure 11:
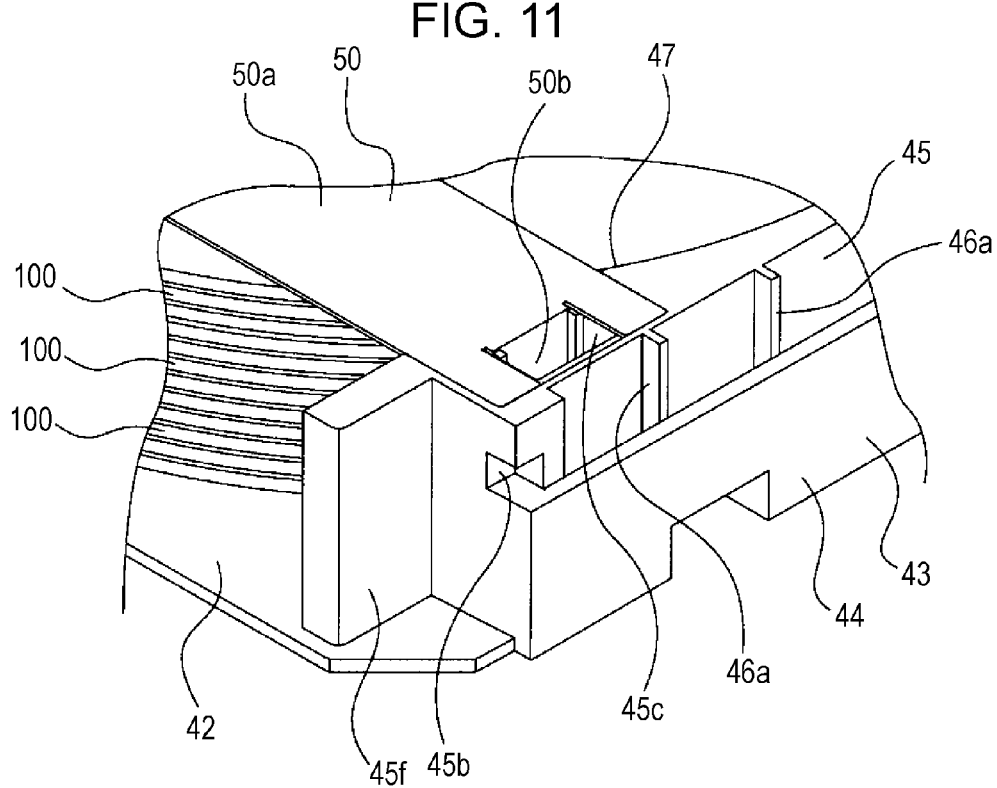
FIG. 11 is an enlarged perspective view showing a state that the bridge member is attached to the second shell.
Figure 12:
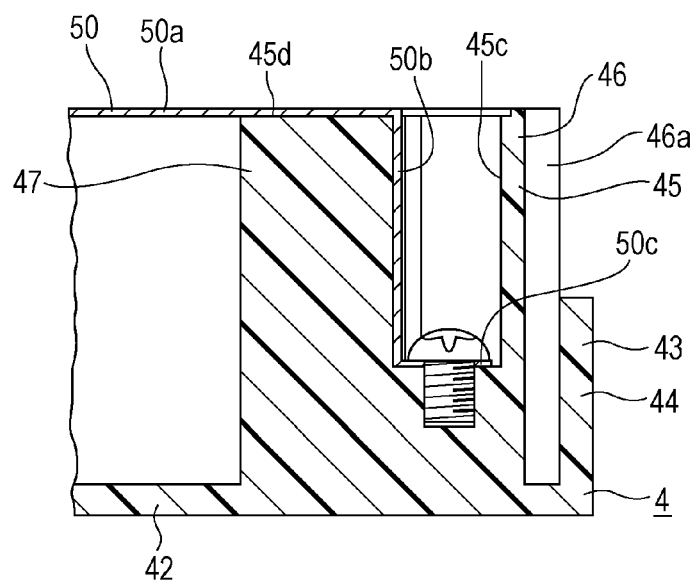
FIG. 12 is an enlarged sectional view showing the state that the bridge member is attached to the second shell.

One bent part 50b and one attached face part 50c of the bridge member 50 are inserted into one attachment hole 45c of one internal wall part 45 and the other bent part 50b and the other attached face part 50c are inserted into the other attachment hole 45c of the other internal wall part 45, and the attached face parts 50c and 50c are screwed, for example, so as to attach the bridge member 50 to the second shell 4. In the state that the bridge member 50 is attached to the second shell 4, right and left end parts of the bridging part 50a are respectively disposed on the step faces 45d and 45d of the internal wall parts 45 and 45 and thus the upper face of the bridging part 50a and upper faces of parts other than the step faces 45d and 45d of the internal wall parts 45 and 45 are set to be coplanar, as shown in FIGS. 11 and 12.

As described above, the second shell 4 includes the thin part 42a on the central part, in the right-left direction, of the base plate 42 and the bridge member 50 is attached between the lateral faces 43 and 43.

Thus, the thin part 42a is formed at the central part, in the right-left direction, of the base plate 42, so that high strength of the part, other than the thin part 42a, of the base plate 42 is secured and deformation hardly occurs. Therefore, stress easily concentrates on the thin part 42a. However, since the lateral faces 43 and 43 are coupled by the bridge member 50, high strength of the whole of the second shell 4 can be secured.

Since the lateral faces 43 and 43 are coupled by the bridge member 50, the distance between the lateral faces 43 and 43 is maintained constant and therefore the positional accuracy of the holding grooves 45e, 45e, . . . which are formed on the lateral faces 43 and 43 is improved. Accordingly, the positional accuracy of the disk-shaped recording media 100, 100, . . . which are held by the holding grooves 45e, 45e, . . . is improved and thus the holding state of the disk-shaped recording media 100, 100, . . . can be favorably secured.

Further, the second shell 4 is made of a resin material and the bridge member 50 is made of a metal material. Accordingly, formability of the second shell 4 can be improved and the strength of the whole of the second shell 4 and the positional accuracy of the lateral faces 43 and 43 can be further improved.

Furthermore, the bridge member 50 includes the bridging part 50a and the pair of bent parts 50b and 50b that are protruded to the same direction, which is orthogonal to the bridging part 50a, respectively from right and left end parts of the bridging part 50a. Accordingly, the strength of the bridge member 50 is improved and the strength of the whole of the second shell 4 and the positional accuracy of the lateral faces 43 and 43 can be furthermore improved.

In addition, the bridge member 50 is attached such that the upper face of the bridging part 50a of the bridge member 50 and the upper faces of the lateral faces 43 and 43 are set to be coplanar. Therefore, the lateral faces 43 and 43 are pressed by both right and left end faces of the bridging part 50a from the inside (refer to FIG. 12). Accordingly, the positional accuracy of the lateral faces 43 and 43 can be further improved.

Further, since the bridge member 50 is attached such that the upper face of the bridging part 50a of the bridge member 50 and the upper faces of the lateral faces 43 and 43 are set to be coplanar, the disk cartridge 1 can be thinned in the vertical direction.

Figure 13:
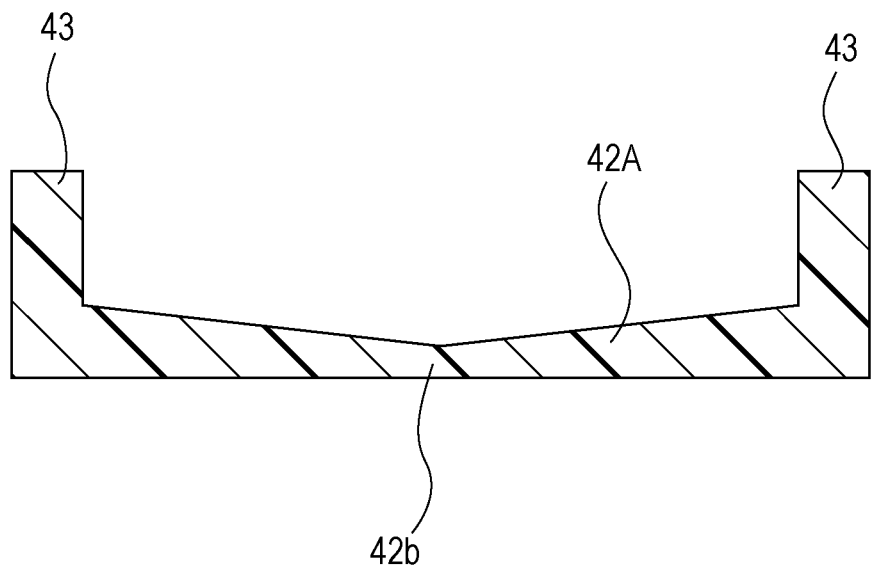
FIG. 13 is a sectional view showing another configuration of a thin part of the second shell.
Figure 14:
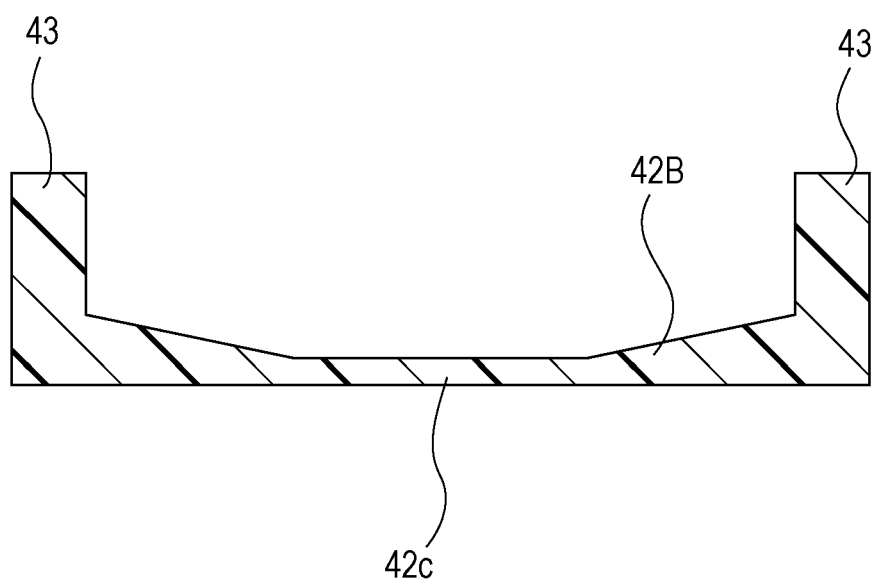
FIG. 14 is a sectional view showing yet another configuration of the thin part of the second shell.

The above description shows the example that the thin part 42a is provided by forming a step on the central part, in the right-left direction, of the base plate 42. However, the shape of the thin part is not limited to this example. For example, as shown in FIG. 13, a thin part 42b may be formed such that the thickness of a base plate 42A is reduced toward the center thereof. Further, as shown in FIG. 14, a thin part 42c may be formed such that the thickness of right and left side parts of a base plate 42B is reduced toward the center thereof and the thickness of the central part is set to be constant.

In the disk cartridge 1 configured as above, the disk-shaped recording media 100, 100, . . . are held in the inside of the case body 2 (refer to FIG. 2). In the state that the first shell 3 and the second shell 4 are separated, an outer circumference of the disk-shaped recording medium 100 is inserted from the front side to the holding grooves 45e and 45e which are formed on the lateral faces 43 and 43 of the second shell 4 and thus the disk-shaped recording medium 100 is held in the inside of the case body 2. Accordingly, the opening positioned on the front edge of the second shell 4 is formed as a disk inserting/ejecting slot 4a into and from which insertion and ejection of the disk-shaped recording media 100, 100, . . . are performed with respect to the second shell 4.

In the state that the first shell 3 and the second shell 4 are joined to each other, the open/close panel 37 is attached to the first shell 3, and thus the case body 2 is structured, insertion grooves 2a and 2a which extend frontward and rearward are respectively formed between the lower faces of the side faces 8 and 8 of the first shell 3 and the upper faces of the external wall parts 44 and 44 of the second shell 4 (refer to FIG. 1). The rear ends of the insertion grooves 2a and 2a are continuously formed to be connected to the slider supporting parts 3a and 3a of the first shell 3 respectively and the front ends are continuously formed so as to be connected to the insertion cutouts 38b and 38b respectively which are formed on the panel part 38 of the open/close panel 37.

In the state that the case body 2 is configured as described above, the outer faces of the ribs 46a, 46a, . . . which are formed on the internal wall parts 45 and 45 of the second shell 4 respectively contact with the inner faces of the side faces 8 and 8 of the first shell 3. Thus, the internal wall parts 45 and 45 and the side faces 8 and 8 are not brought into surface-contact with each other. Therefore, when a load is given to the first shell 3 from the lateral direction, the load transmitted to the internal wall parts 45 and 45 is reduced. Thus, shock resistance can be enhanced.

[Joining Operation and Separating Operation of Disc Cartridge]

A joining operation and a separating operation of the disk cartridge 1 is described below (refer to FIGS. 15 to 27).

Figure 15:
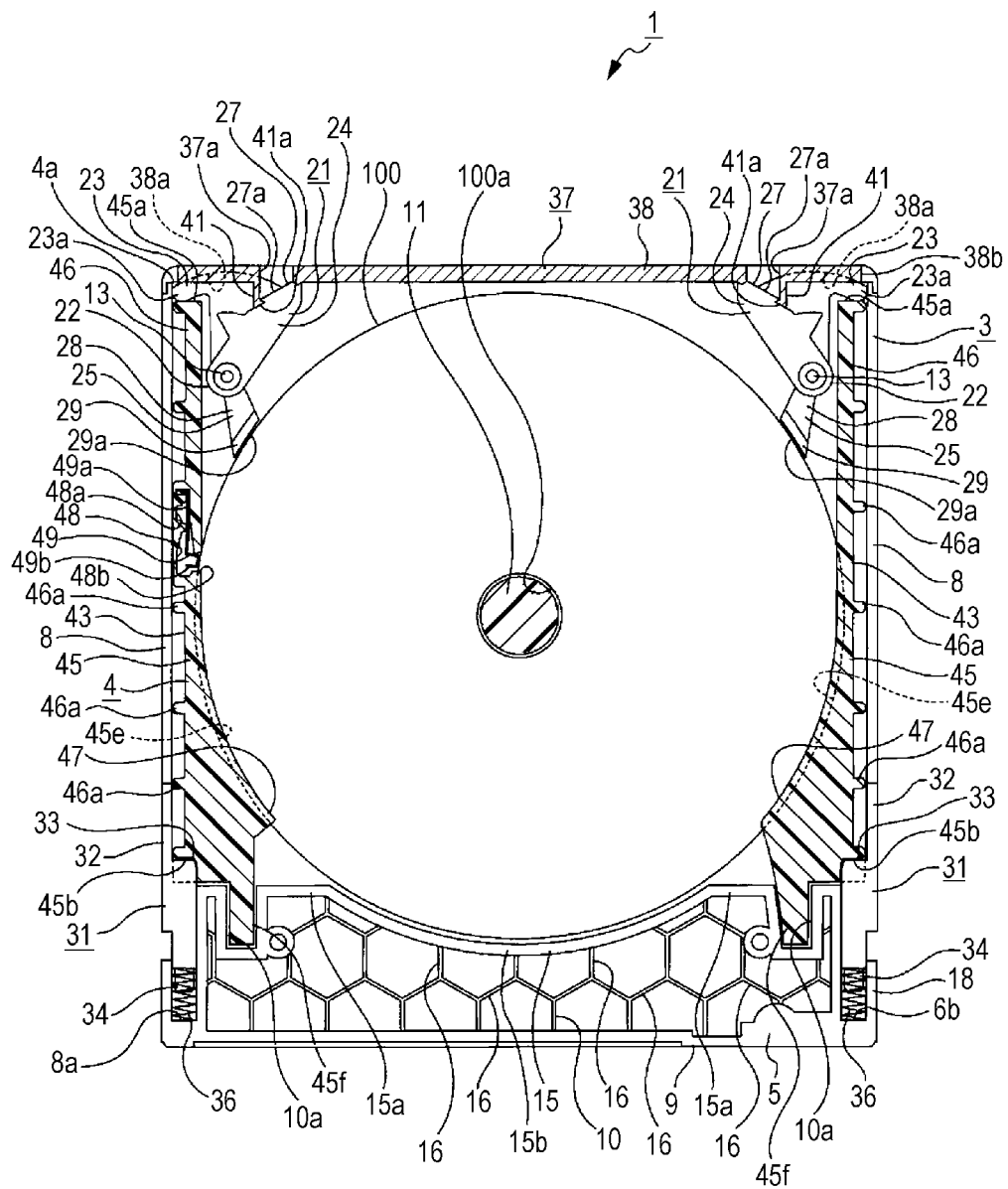
FIG. 15 is an enlarged sectional view showing a state the disk-shaped recording media are placed and held on a regular position.
Figure 16:
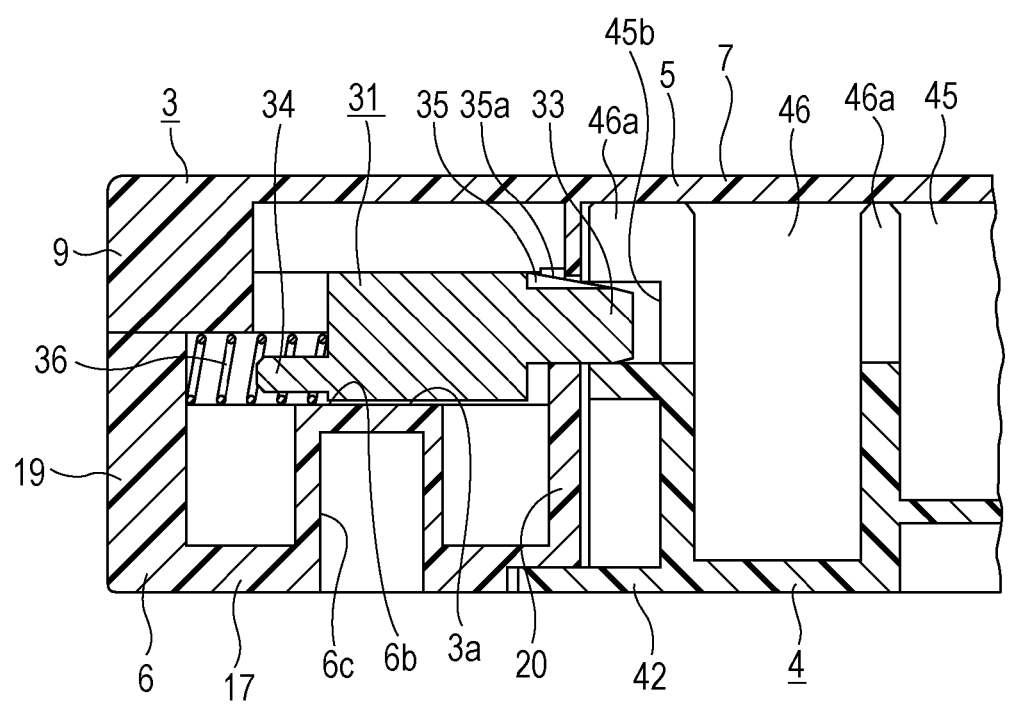
FIG. 16 is an enlarged sectional view showing a state that the first shell and the second shell are locked by the lock slider.

A state that the first shell 3 and the second shell 4 are joined to each other is first described (refer to FIGS. 15 and 16).

The first shell 3 and the second shell 4 are joined to each other in such manner that the base face 7 of the base body 5 and the base plate 42 are vertically opposed to each other.

In the state that the first shell 3 and the second shell 4 are joined to each other, the first shell 3 and the second shell 4 are locked by the lock levers 21 and 21 and the lock sliders 31 and 31.

The lock levers 21 and 21 are disposed on rotating ends in the direction in which the end parts of the lock parts 23 and 23 are separated from each other (outward) by energizing force of the energizing springs 30 and 30 (refer to FIG. 15), and the lock parts 23 and 23 are respectively inserted into and engaged with the first locking concave parts 45a and 45a, which are respectively formed on the lateral faces 43 and 43 of the second shell 4. At this time, the first locking concave parts 45a and 45a are tightly closed by the lock parts 23 and 23.

The lock sliders 31 and 31 are disposed on front-side moving ends by energizing force of the coil springs 36 and 36 (refer to FIGS. 15 and 16), and the lock parts 33 and 33 are respectively inserted into and engaged with the second locking concave parts 45b and 45b, which are formed on the lateral faces 43 and 43 of the second shell 4.

In the state that the first shell 3 and the second shell 4 are joined to each other and locked as described above and the disk-shaped recording media 100, 100, . . . are held in the inside of the case body 2, the spring parts 49b, 49b, . . . of the holding spring 49 are respectively brought into contact with and pressed to one parts of the outer circumferential faces of the disk-shaped recording media 100, 100, . . . (refer to FIG. 15). At this time, other parts of the outer circumferential faces of the disk-shaped recording media 100, 100, . . . are pressed to parts, which are respectively formed on the circular-arc surface parts 47 and 47 of the lateral faces 43 and 43, of the holding grooves 45e, 45e, . . . , and thus the disk-shaped recording media 100, 100, . . . are positioned on regular positions in the inside of the case body 2.

In the state that the disk-shaped recording media 100, 100, . . . are placed on the regular positions, the regulation part 15b of the external wall 15 which is provided to the reinforcing part 10 of the first shell 3 or the regulation part 20b of the front face plate 20 which is provided to the auxiliary base 6 is placed close to a part on the rear end side of the outer circumferential face of the disk-shaped recording medium 100. Further, the regulation faces 29a and 29a which are respectively formed on the balance parts 25 and 25 of the lock levers 21 and 21 are placed close to a part on the front end side of the outer circumferential face of the disk-shaped recording medium 100.

Accordingly, even in a case where vibration or shock is applied to the disk cartridge 1 and the disk-shaped recording media 100, 100, . . . are displaced from the located positions, the positions of the disk-shaped recording media 100, 100, . . . are regulated by the regulation part 15b, the regulation part 20b, or the regulation faces 29a and 29a and thus the positioned state is maintained.

In the state that the first shell 3 and the second shell 4 are joined to each other, the lock-release parts 24 and 24 of the lock levers 21 and 21 are respectively pressed to the inclined faces 41a and 41a of the insertion parts 41 and 41 of the open/close panel 37 from the rear side by energizing force of the energizing springs 30 and 30. At this time, the insertion protrusion parts 27 and 27 are respectively inserted into the insertion holes 37a and 37a of the open/close panel 37 from the rear side.

Thus, the insertion protrusion parts 27 and 27 of the lock levers 21 and 21 are respectively inserted into the insertion holes 37a and 37a of the open/close panel 37 in the disk cartridge 1, so that dusts or moisture hardly enter the inside of the case body 2 from outside. Thus, the air-tightness of the case body 2 is high and accordingly, the storage state of data which are recorded in the disk-shaped recording media 100, 100, . . . can be favorably secured.

Further, the right and left lateral faces 27b and 27b of the insertion protrusion parts 27 and 27 are respectively formed in the circular-arc shape centered on the central axis of the attached supporting parts 22 and 22. Therefore, the inserting operation and the drawing operation of the insertion protrusion parts 27 and 27 with respect to the insertion holes 37a and 37a can be smoothly performed in rotation of the lock levers 21 and 21. Furthermore, thanks to the lateral faces 27b and 27b which are formed in the circular-arc shape centered on the central axis of the attached supporting parts 22 and 22, in the state that the insertion protrusion parts 27 and 27 are inserted into the insertion holes 37a and 37a, air-tightness of the case body 2 can be favorably secured irrespective of the rotating positions of the lock levers 21 and 21.

Figure 17:
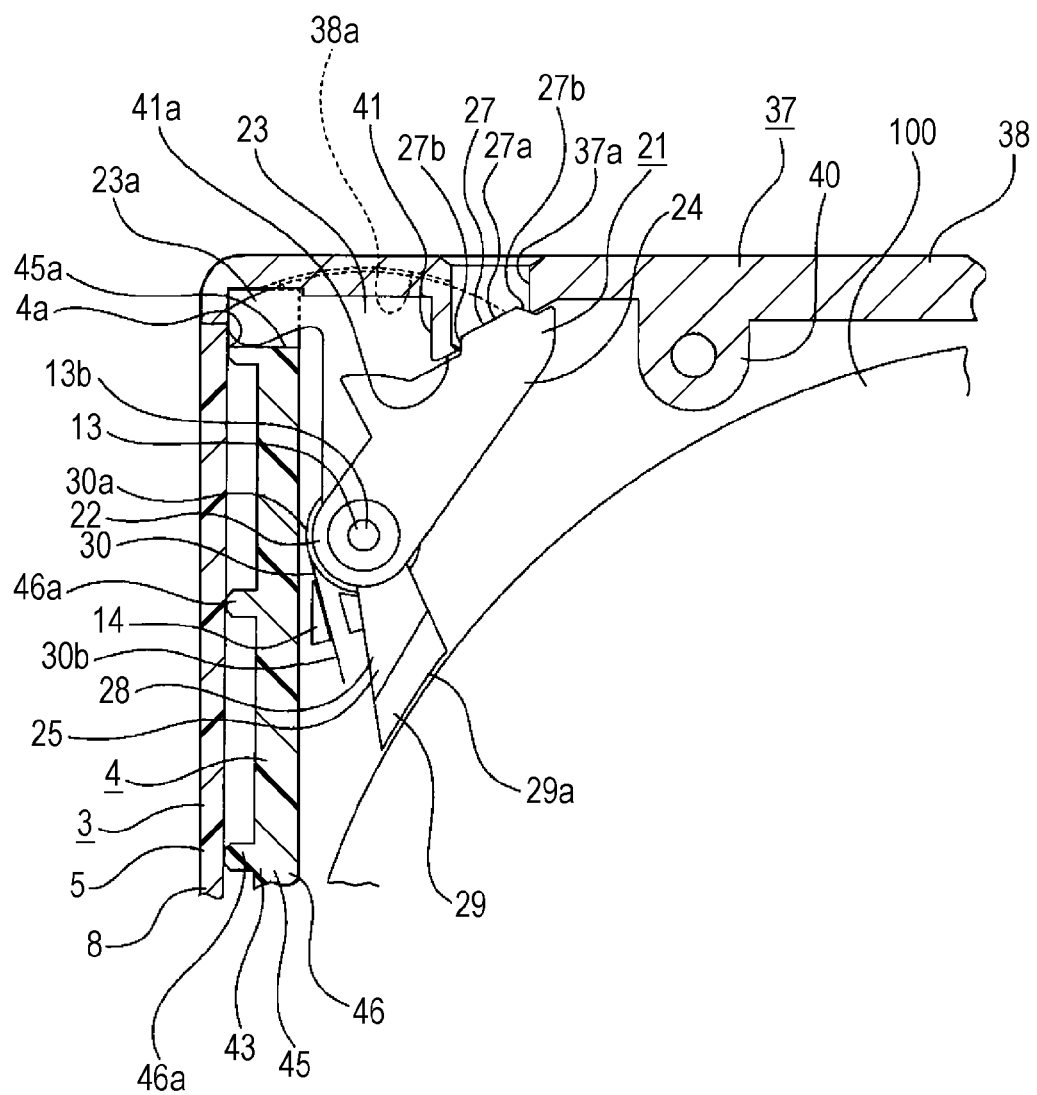
FIG. 17 is an enlarged sectional view showing a state that a taper-shaped insertion protrusion part is inserted into an insertion hole of an open/close panel.

Here, the insertion protrusion parts 27 and 27 may be formed to have a taper shape of which an outer shape becomes smaller toward the end part, as shown in FIG. 17. By forming the insertion protrusion parts 27 and 27 in the taper shape, the outer circumferential faces of the insertion protrusion parts 27 and 27 easily attach firmly to the rear side opening edge of the insertion holes 37a and 37a, further enhancing the air-tightness of the inside of the case body 2.

Further, in the state that the first shell 3 and the second shell 4 are joined to each other in the disk cartridge 1, the locking protrusion parts 23a and 23a of the lock parts 23 and 23 of the lock levers 21 and 21 are inserted into the first locking concave parts 45a and 45a which are formed on the lateral faces 43 and 43 of the second shell 4 and thereby the first locking concave parts 45a and 45a are closed by the locking protrusion parts 23a and 23a.

Accordingly, the air-tightness of the inside of the case body 2 can be further enhanced.

In addition, the locking protrusion parts 23a and 23a of the lock parts 23 and 23 are formed to have a taper shape. Therefore, the locking protrusion parts 23a and 23a easily attach firmly to the opening edge of the first locking concave parts 45a and 45a, further enhancing the air-tightness of the inside of the case body 2.

Here, it is preferable that the lock levers 21 and 21 be respectively set to be movable in the axial direction of the supporting shafts 13 and 13 and inclined faces be formed as guiding faces on both upper and lower faces of parts, at which the insertion concave parts 38a and 38a are formed, of the open/close panel 37. With such configuration, the insertion property of the lock levers 21 and 21 with respect to the insertion concave parts 38a and 38a can be improved.

In the state that the first shell 3 and the second shell 4 are joined to each other, the center pin 11 which is provided to the first shell 3 is inserted into central holes 100a, 100a, . . . of the disk-shaped recording media 100, 100, . . . . At this time, the inner face of the panel part 38 of the open/close panel 37 is positioned close to the front edges of the disk-shaped recording media 100, 100, . . . .

Figure 18:
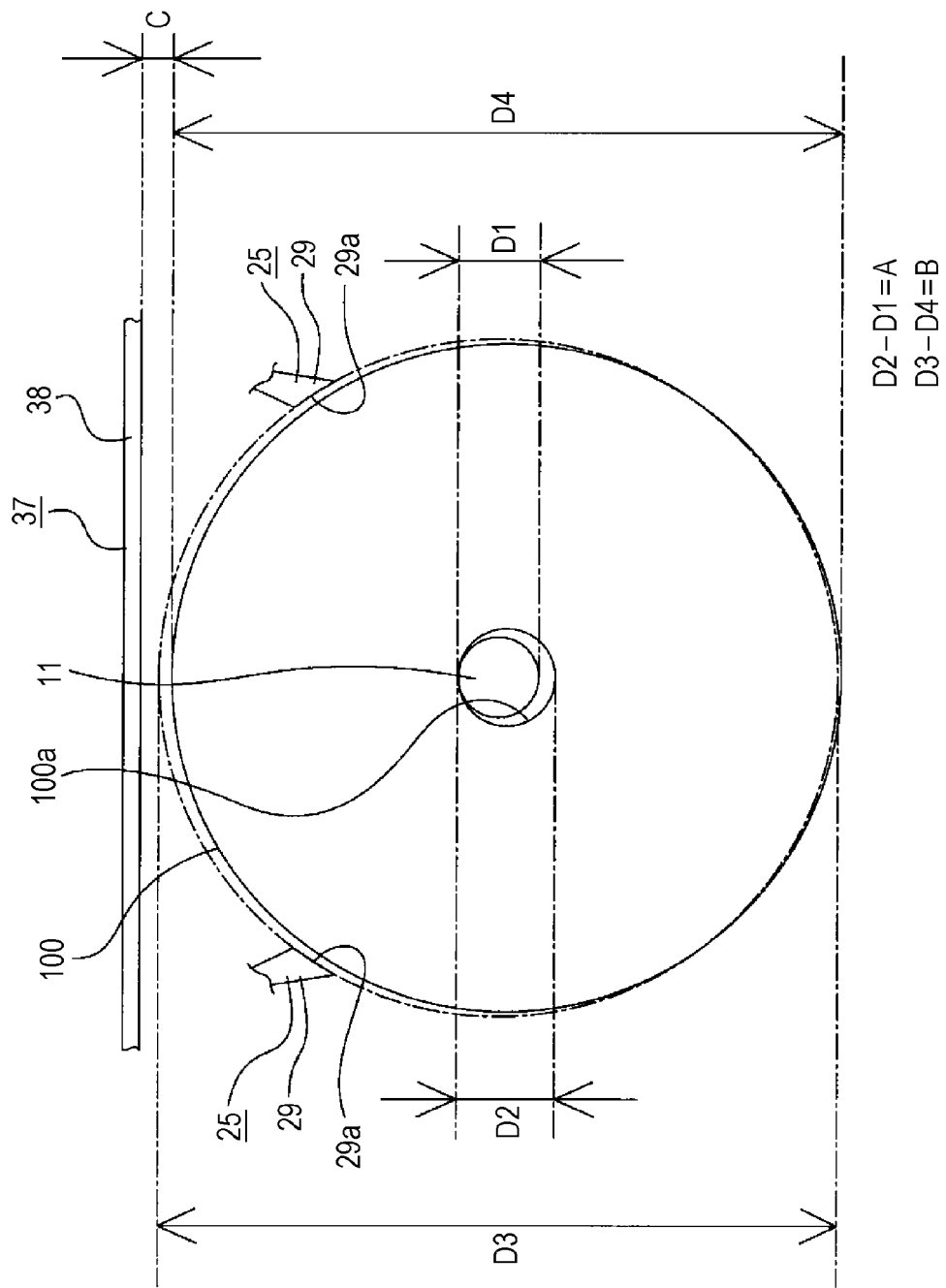
FIG. 18 illustrates a dimensional relationship of respective elements.

In the disk cartridge 1, the following dimensional relationship is set (refer to FIG. 18). FIG. 18 is a conceptual diagram that shows a state in which the disk-shaped recording medium 100 is pressed rearward to the center pin 11, so as to facilitate the following description.

A difference between a diameter D1 of the center pin 11 and a diameter D2 of the central hole 100a of the disk-shaped recording medium 100 is denoted as A, a difference between a diameter D3 of a circle obtained by extending the regulation faces 29a and 29a which are respectively provided to the lock-release parts 24 and 24 of the lock levers 21 and 21 and a diameter D4 of the disk-shaped recording medium 100 is denoted as B, and a difference between the outer circumferential face of the disk-shaped recording medium 100 which is pressed rearward to the center pin 11 and the inner face of the open/close panel 37 is denoted as C.

At this time, the dimensional relationship which is C>A>B is set in the disk cartridge 1.

Accordingly, in a case where displacement occurs with respect to the state that the disk-shaped recording medium 100 is placed on a regular position (refer to FIG. 15), the outer circumferential face of the disk-shaped recording medium 100 contacts with the regulation faces 29a and 29a of the lock-release parts 24 and 24 by B which has the smallest distance difference and thus the position of the disk-shaped recording medium 100 is regulated.

Further, even in a case where large shock or the like is applied to the disk cartridge 1 and therefore large displacement or deformation of the disk cartridge 1 or the disk-shaped recording medium 100 occurs, for example, the inner circumferential face of the disk-shaped recording medium 100 contacts with the center pin 11 by A of which the distance difference is smaller than that of C and thus the position of the disk-shaped recording medium 100 is regulated.

Thus, in the case where the displacement of the disk-shaped recording medium 100 occurs, the position of the disk-shaped recording medium 100 is regulated by the regulation faces 29a and 29a or the center pin 11 and therefore the outer circumferential face of the disk-shaped recording medium 100 does not contact with the inner face of the panel part 38 of the open/close panel 37.

Accordingly, when the first shell 3 is moved upward with respect to the second shell 4 and thus the first shell 3 and the second shell 4 are separated from each other, the panel part 38 does not slide and contact with the outer circumferential face of the disk-shaped recording medium 100 and thereby occurrence of damage or breakage of the disk-shaped recording medium 100 can be prevented.

Further, in the disk cartridge 1, the lock lever 21 for locking the first shell 3 and the second shell 4 includes not only the supported part 22, the lock part 23, and the lock-release part 24 but also the balance part 25. Thanks to the provision of the balance part 25, the gravity center of the lock lever 21 is positioned on the center or the vicinity of the center of the supported part 22.

Accordingly, when large shock is applied to the case body 2, for example, when the disk cartridge 1 is accidentally dropped, the lock levers 21 and 21 are hardly rotated by the shock and the lock in the joining state is prevented from being released. Thus, even when large shock is applied, unintentional lock-release is prevented. Therefore, the disk-shaped recording medium 100 which is housed inside is not damaged or the disk-shaped recording medium 100 does not pop out from the case body 2, being able to favorably maintain data recorded in the disk-shaped recording medium 100.

Further, since the gravity center of the lock lever 21 is positioned on the center or the vicinity of the center of the supported part 22, a load given to the energizing springs 30 and 30 can be reduced. Here, the load with respect to the energizing springs 30 and 30 is similarly reduced also in a case where the case body 2 has a vertically long shape and the disk-shaped recording media 100, 100, . . . are stored to face the horizontal direction.

Further, since the regulation faces 29a and 29a which regulate the position of the disk-shaped recording medium 100 are respectively formed on the balance parts 25 and 25 of the lock levers 21 and 21, displacement of the disk-shaped recording medium 100 can be prevented and the number of parts can be reduced.

Furthermore, since the regulation faces 29a and 29a of the balance parts 25 and 25 are formed to have the circular-arc surface shape which follows the outer circumferential face of the disk-shaped recording medium 100, positioning accuracy of the disk-shaped recording medium 100 can be improved.

In addition, in the disk cartridge 1, the case body 2 is provided with the center pin 11 which is inserted into the central holes 100a, 100a, . . . of the disk-shaped recording media 100, 100, . . . so as to regulate the positions of the disk-shaped recording media 100, 100, . . . . Accordingly, the positions of the disk-shaped recording media 100, 100, . . . are simultaneously regulated when the first shell 3 and the second shell 4 are joined to each other, and thus positional regulation of the disk-shaped recording medium 100 can be simply and securely performed.

In the state that the first shell 3 and the second shell 4 are joined to each other and locked as described above, parts of the lock parts 23 and 23 of the lock levers 21 and 21 are respectively inserted into the insertion concave parts 38a and 38a which are formed on the panel part 38 of the open/close panel 37 (refer to FIGS. 15 and 17). Accordingly, when large shock is applied to the case body 2, for example, when the disk cartridge 1 is accidentally dropped, movement of the lock parts 23 and 23 is regulated by the insertion concave parts 38a and 38a, and therefore, the lock levers 21 and 21 are hardly inclined, and damage of the supporting shafts 13 and 13 is prevented. Accordingly, the disk-shaped recording medium 100 is not damaged or the disk-shaped recording medium 100 does not popped out from the case body 2, and therefore data recorded in the disk-shaped recording medium 100 can be favorably maintained.

The lock levers 21 and 21 are positioned on the front side in the extent of the insertion concave parts 38a and 38a which are formed on the panel part 38, so that the widths, in the front-back direction, of the first locking concave parts 45a and 45a which are formed on the lateral faces 43 and 43 of the second shell 4 can be reduced. Accordingly, the disk-shaped recording medium 100 can be prevented from dropping when the disk-shaped recording medium 100 is inserted into or ejected from the disk inserting/ejecting slot 4a of the second shell 4.

Furthermore, in the energizing springs 30 and 30, the coil parts 30a and 30a are respectively supported by the spring supporting parts 13a and 13a, which are provided on the base face 7 side, of the supporting shafts 13 and 13, one arm parts 30b and 30b are respectively supported by the spring hook protrusion parts 14 and 14 which are provided on the base face 7, and the other arm parts 30c and 30c are respectively supported by the spring supporting protrusion parts 23b and 23b, which are protruded toward the base face 7 side, of the lock levers 21 and 21.

Thus, all parts of the energizing springs 30 and 30 are disposed along the base face 7. Accordingly, the space of the inside of the case body 2 is effectively used and the size of the case body 2 can be reduced.

Further, in the disk cartridge 1, in the state that the lock levers 21 and 21 are respectively supported by the supporting shafts 13 and 13, the attached protrusion parts 39 and 39 of the open/close panel 37 are respectively attached to the supporting shafts 13 and 13.

Accordingly, inclination of the supporting shafts 13 and 13 can be prevented by the attached protrusion parts 39 and 39.

In addition, in the disk cartridge 1, the attached protrusion parts 39 and 39 which are attached to the supporting shafts 13 and 13 are respectively positioned to be opposed to and close to the lock levers 21 and 21.

Accordingly, the lock levers 21 and 21 and the energizing springs 30 and 30 can be prevented from dropping from the supporting shafts 13 and 13, and movement of the lock levers 21 and 21 in the axial direction of the supporting shafts 13 and 13 is regulated, being able to optimize the rotating operation of the lock levers 21 and 21.

In the state that the first shell 3 and the second shell 4 are joined to each other as described above, the disk cartridge 1 is inserted from a cartridge inserting/ejecting port, which is not shown, of a disk changer and held by a lock-releasing mechanism 70 which is provided to the disk changer, for example.

Figure 19:
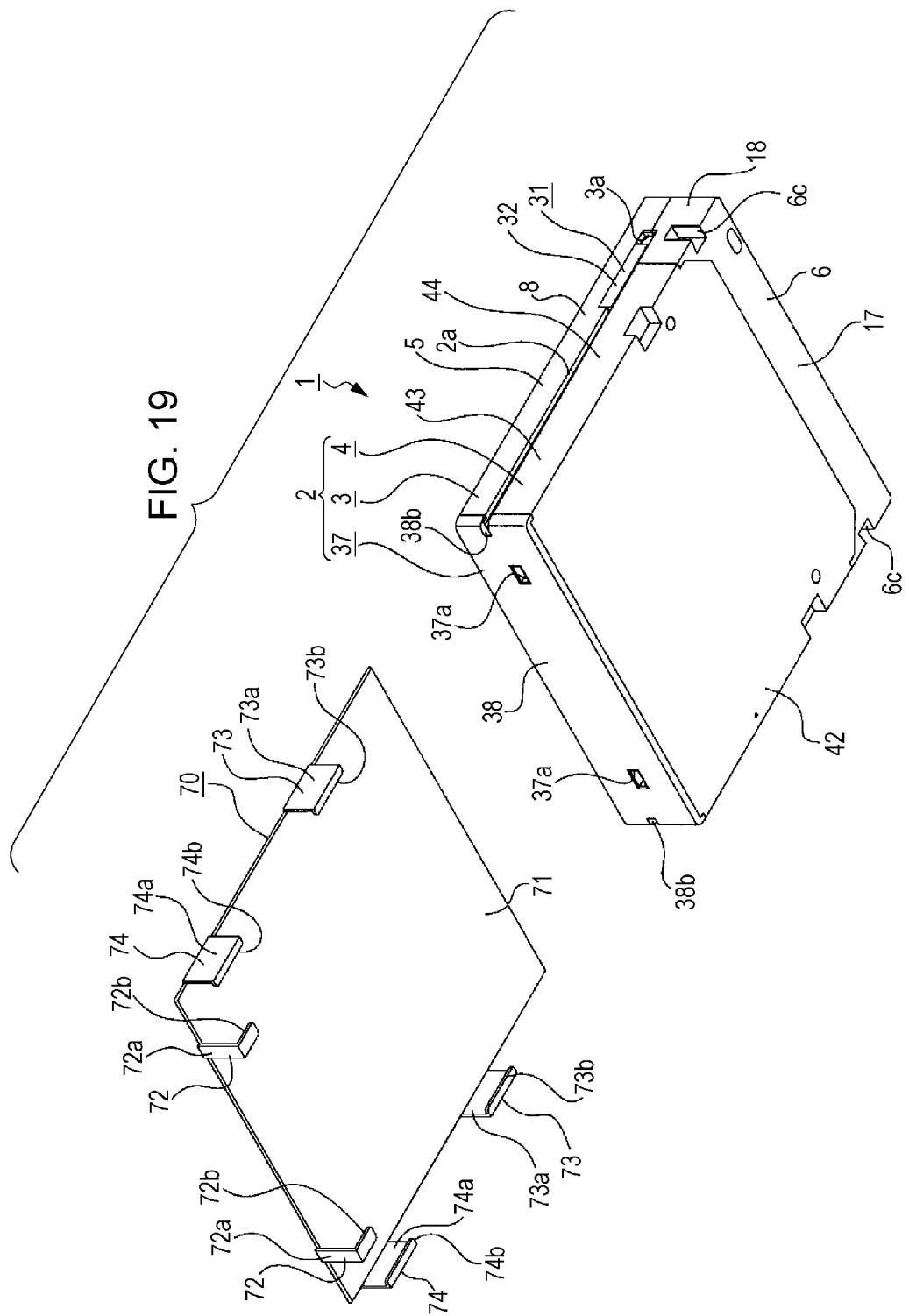
FIG. 19 is a perspective view showing the disk cartridge and a lock-releasing mechanism.

The lock-releasing mechanism 70 is formed such that main elements are provided to a holding base 71 which has a rectangular plate shape and face the vertical direction, for example, as shown in FIG. 19.

On the front edge of the holding base 71, release pressing pieces 72 and 72 which are protruded downward and are positioned in a manner to be separated to right and left are provided. The release pressing piece 72 includes a connecting part 72a which is continuously formed to be connected with the holding base 71 and faces the front-back direction and a pressing part 72b which is protruded rearward from the lower edge of the connecting part 72a.

On positions, which are close to the rear end, of right and left edges of the holding base 71, lock-release pieces 73 and 73 which are protruded downward are respectively provided. The lock-release piece 73 includes a connecting part 73a which is continuously formed to be connected with the holding base 71 and faces the right-left direction and a release part 73b which is protruded inward from the lower edge of the connecting part 73a.

On positions, which are close to the front end, of the right and left edges of the holding base 71, auxiliary pieces 74 and 74 which are protruded downward are respectively provided. The auxiliary piece 74 includes a connecting part 74a which is continuously formed to be connected with the holding base 71 and faces the right-left direction and an insertion part 74b which is protruded inward from the lower edge of the connecting part 74a.

Figure 20:
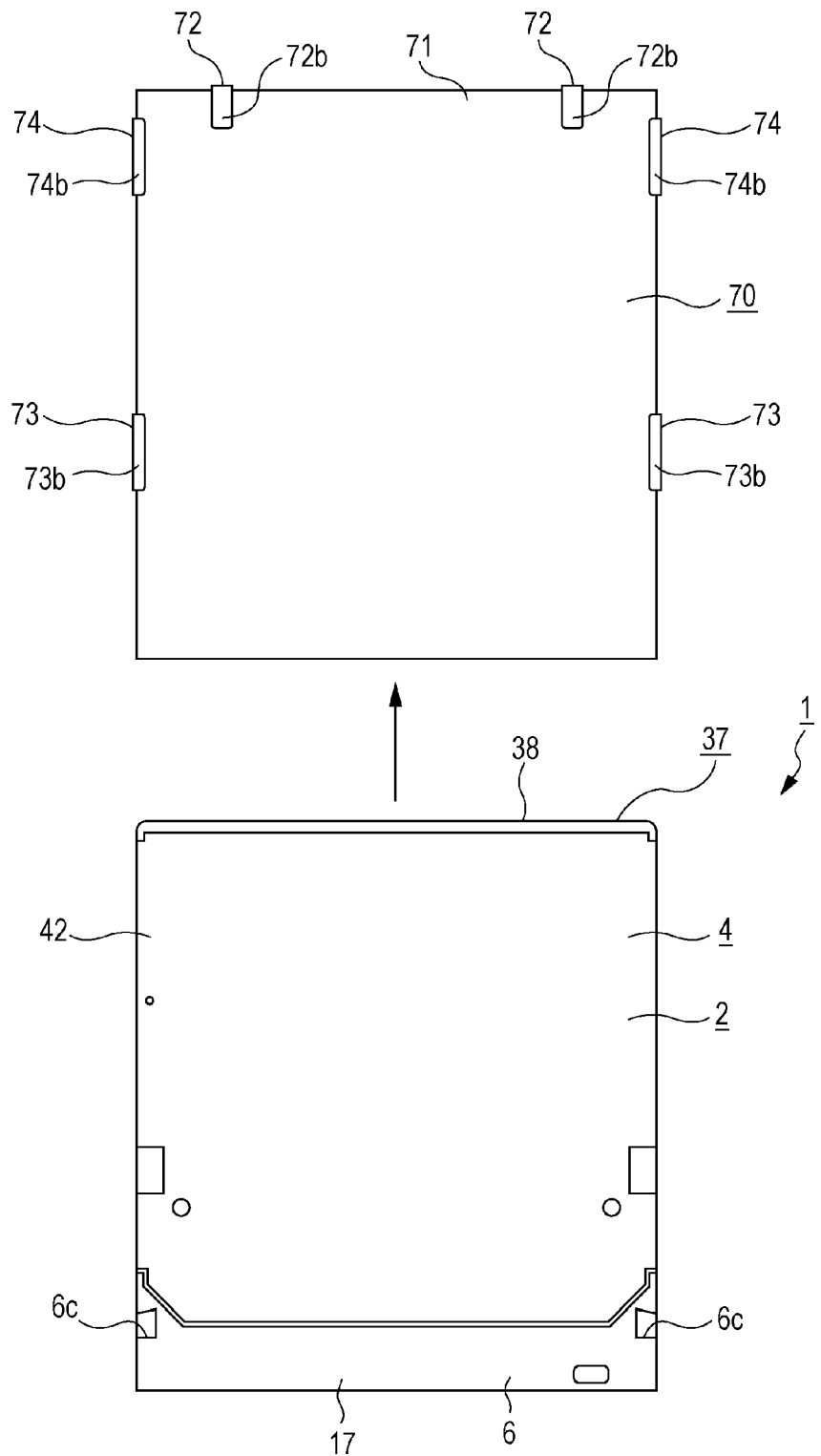
FIG. 20 is a bottom view showing the disk cartridge and the lock-releasing mechanism.

As the disk cartridge 1 is inserted from the cartridge inserting/ejecting port of the disc changer as shown in FIG. 20, respective release parts 73b and 73b of the release pressing pieces 73 and 73 and respective insertion parts 74b and 74b of the auxiliary pieces 74 and 74 of the lock-releasing mechanism 70 are inserted into the insertion grooves 2a and 2a.

Figure 21:
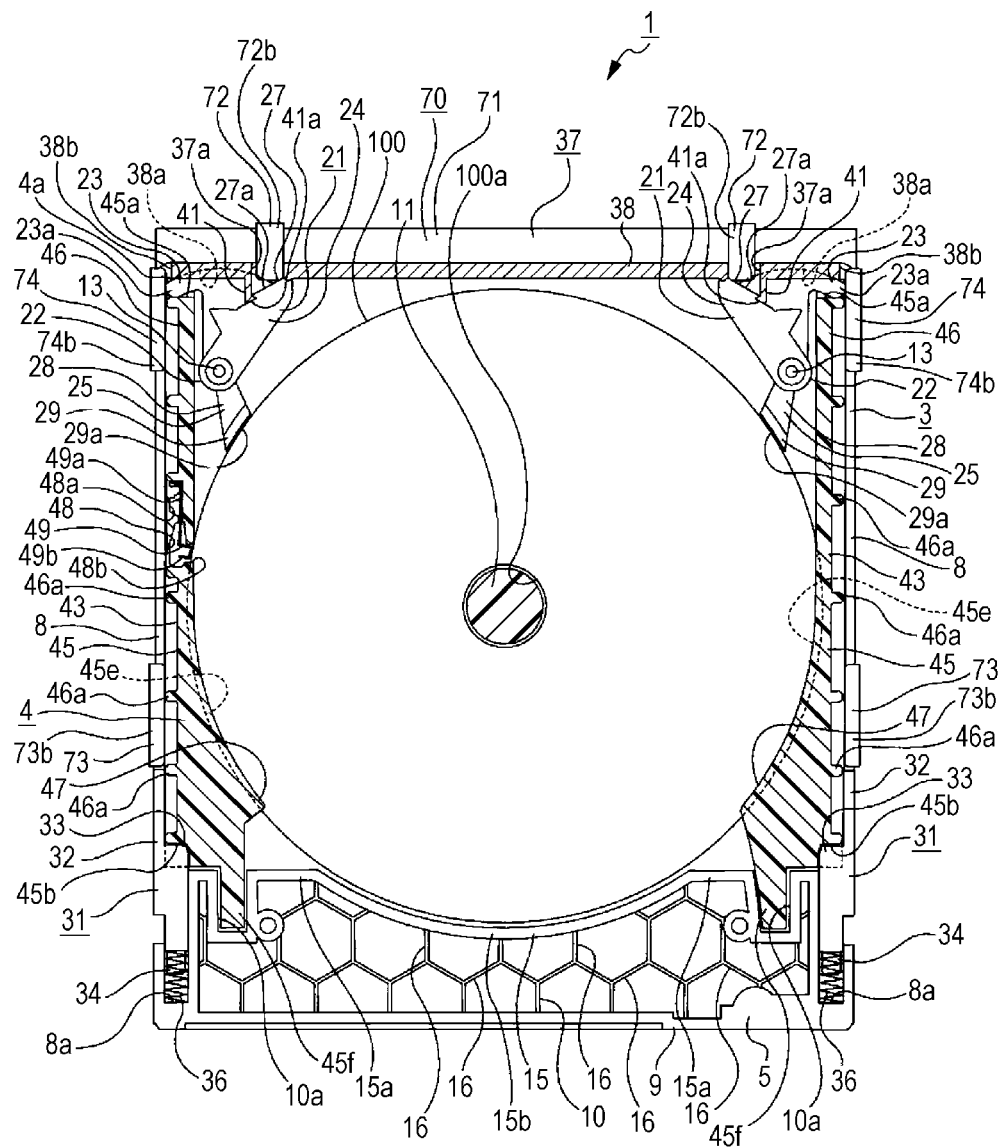
FIG. 21 is a sectional view showing a state immediately before the lock of the first shell and the second shell is released by the lock-releasing mechanism.
Figure 22:
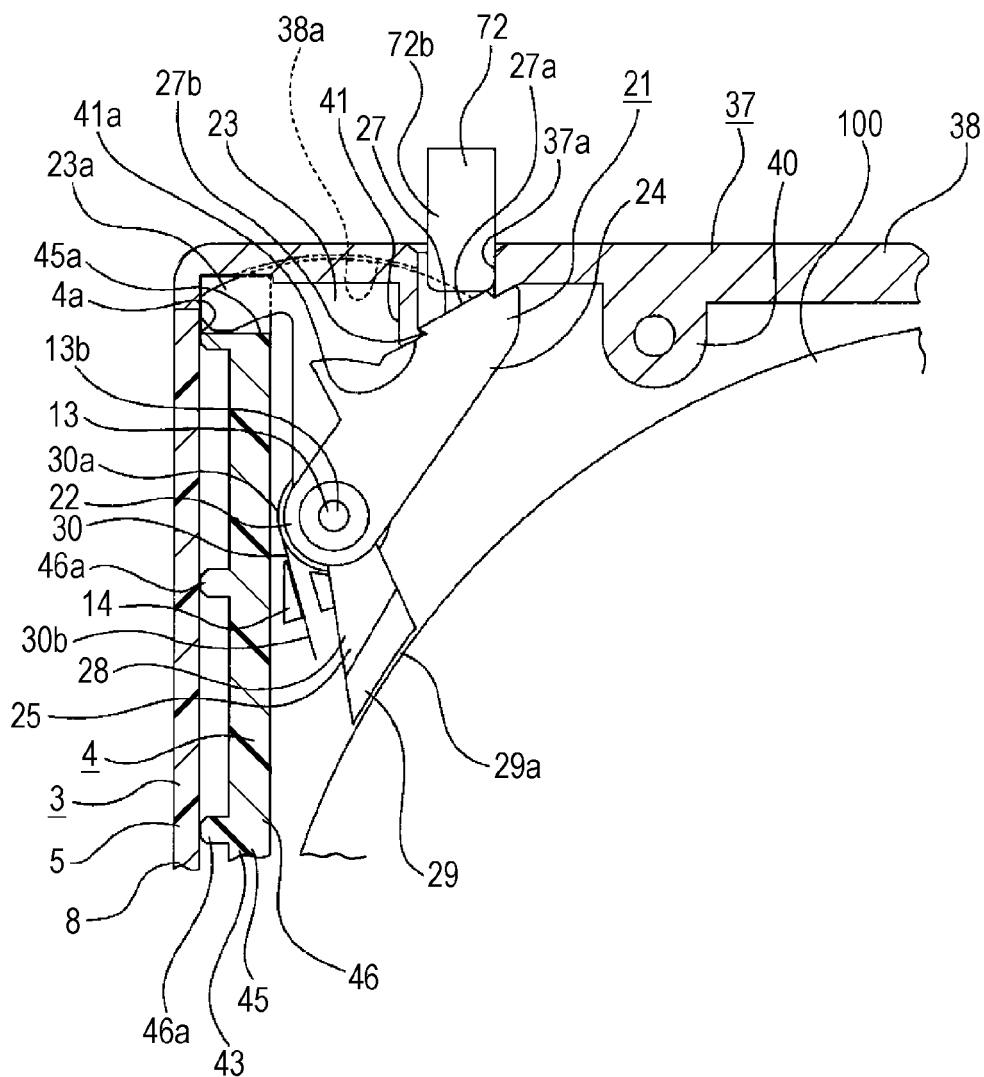
FIG. 22 is an enlarged sectional view showing a state immediately before the lock of the first shell and the second shell is released by the lock-releasing mechanism.

Further, as the disk cartridge 1 is inserted from the cartridge inserting/ejecting port, the pressing parts 72b and 72b of the release pressing pieces 72 and 72 of the lock-releasing mechanism 70 are respectively inserted into the insertion holes 37a and 37a of the open/close panel 37 (refer to FIGS. 21 and 22).

Figure 23:
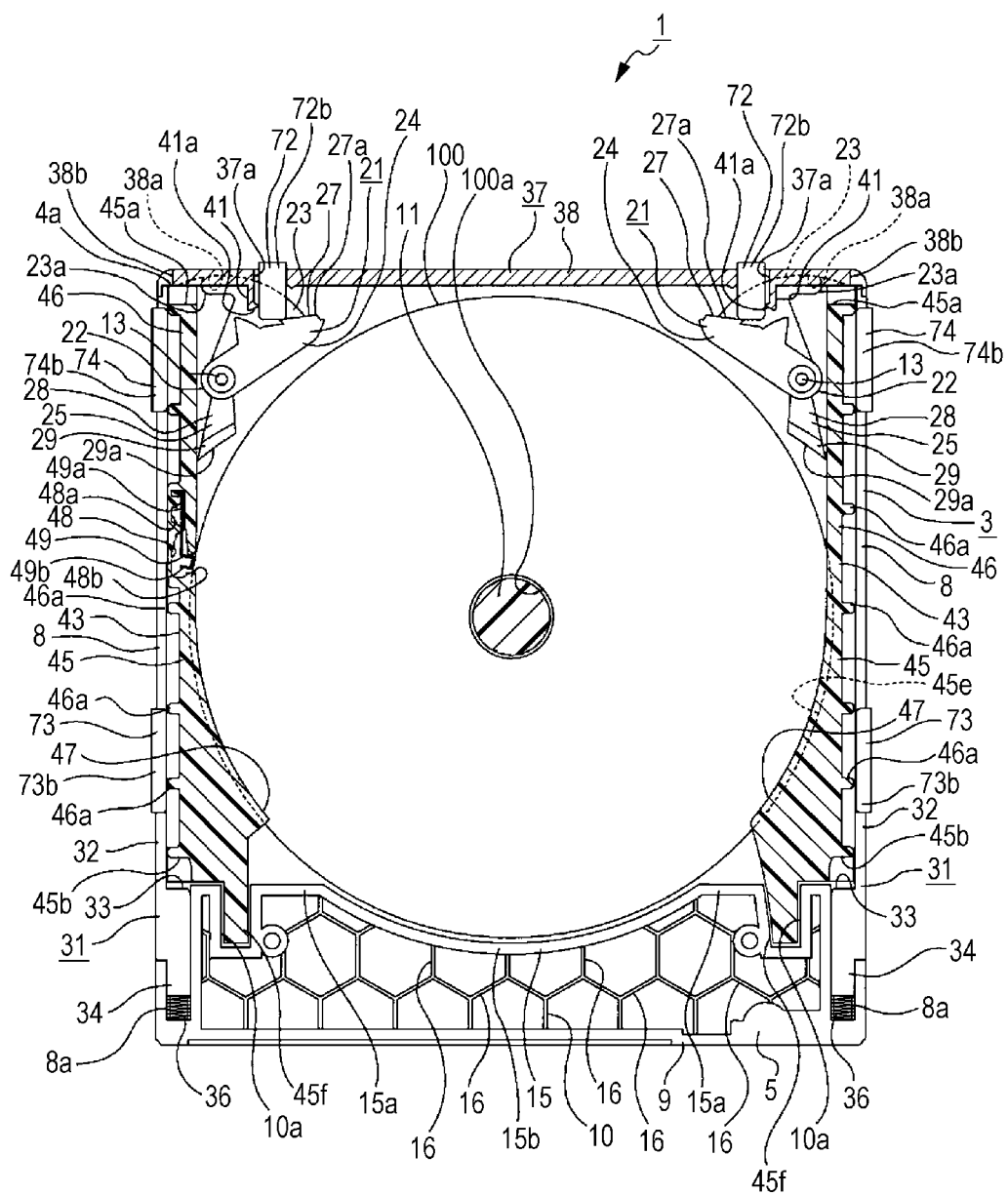
FIG. 23 is a sectional view showing a state that the lock of the first shell and the second shell is released by the lock-releasing mechanism.
Figure 24:
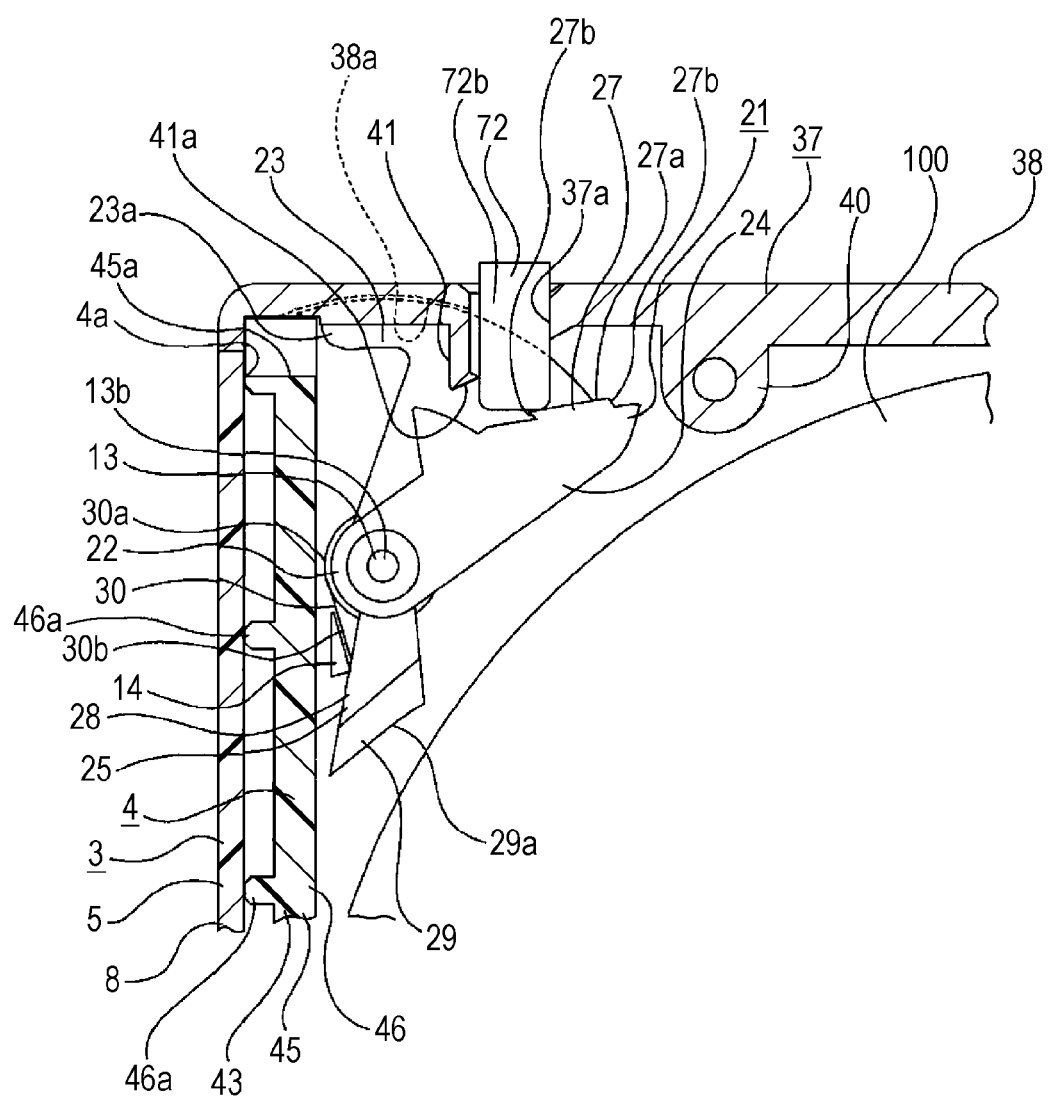
FIG. 24 is an enlarged sectional view showing the state that the lock of the first shell and the second shell is released by the lock-releasing mechanism.

When the pressing part 72b of the release pressing piece 72 is inserted into the insertion hole 37a of the open/close panel 37, the insertion protrusion part 27 of the lock-release part 24 of the lock lever 21 is pressed rearward by the pressing part 72b (refer to FIGS. 23 and 24). At this time, the inclined face 27a, which is inclined in the right-left direction with respect to the front-back direction, of the lock lever 21 is pressed by the pressing part 72b, so that the lock lever 21 is rotated while the inclined face 27a smoothly slides with respect to the pressing part 72b. Thus, a load in the rotating direction of the lock lever 21 is hardly given to the release pressing piece 72.

The lock lever 21 is rotated against the energizing force of the energizing spring 30 by the pressing part 72b, the locking protrusion part 23a of the lock part 23 is pulled out from the first locking concave part 45a of the second shell 4, and thus the lock of the first shell 3 and the second shell 4 by the lock lever 21 is released. When the lock of the first shell 3 and the second shell 4 by the lock lever 21 is released, the regulation face 29a of the balance part 25 is moved to a displaced position from the outer circumferential face of the disk-shaped recording medium 100, and thus the regulation of the disk-shaped recording medium 100 by the regulation face 29a is released.

Figure 25:
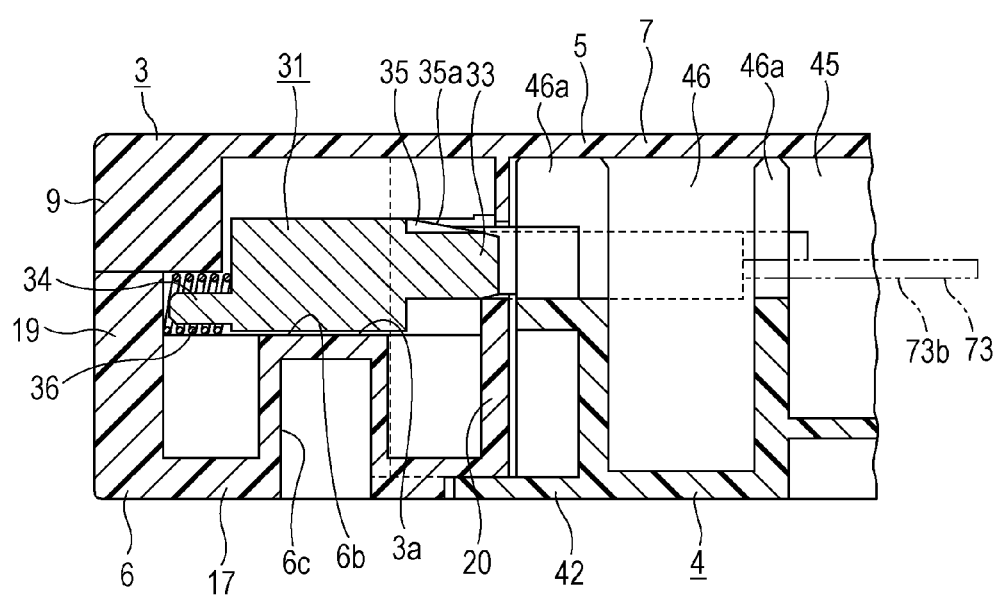
FIG. 25 is an enlarged sectional view showing a state that the lock by the lock slider is released by the lock-releasing mechanism.
Figure 26:
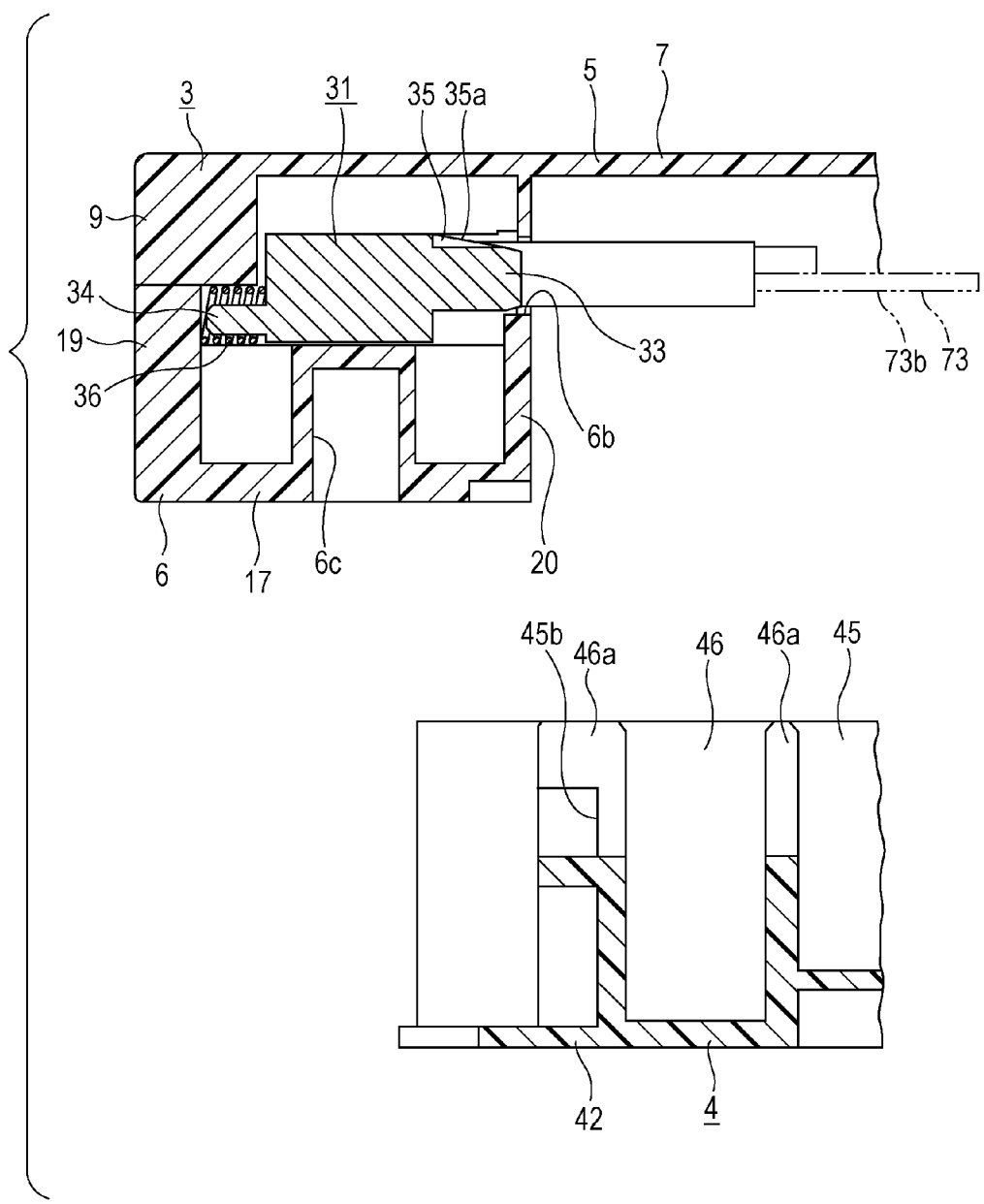
FIG. 26 is an enlarged sectional view showing a state that the lock by the lock slider is released by the lock-releasing mechanism and the first shell and the second shell are separated from each other.

When the lock-release piece 73 is inserted into the insertion groove 2a and the supported part 32 of the lock slider 31 is pressed by the release part 73b, the lock slider 31 is moved rearward against the energizing force of the coil spring 36 and the lock part 33 is pulled out from the second locking concave part 45b of the second shell 4 (refer to FIG. 25). When the lock part 33 is pulled out from the second locking concave part 45b, the lock of the first shell 3 and the second shell 4 by the lock slider 31 is released. The release of the lock of the first shell 3 and the second shell 4 by the lock slider 31 is performed simultaneously with the release of the lock of the first shell 3 and the second shell 4 by the lock lever 21.

When the locks of the first shell 3 and the second shell 4 by the lock levers 21 and 21 and by the lock sliders 31 and 31 are released, the first shell 3 and the second shell 4 become separable in the vertical direction. For example, the second shell 4 is moved downward by a moving mechanism which is not shown (refer to FIG. 26), and the disk-shaped recording medium 100 which is housed is taken out from the case body 2 by a take-out mechanism which is not shown.

When the disk cartridge 1 is inserted into the inside of the disk changer as described above, the grip parts 6c and 6c which are formed on the case body 2 are gripped by a cartridge holding mechanism, which is not shown, so as to be held on or moved to a predetermined position.

At this time, in the disk cartridge 1, the grip parts 6c and 6c are formed on one of the first shell 3 and the second shell 4 which constitute the case body 2. When the grip parts 6c and 6c are formed on the second shell 4, for example, the grip parts 6c and 6c are formed on positions other than a project plane in the axial direction of the disk-shaped recording media 100, 100, . . . which are housed in the case body 2.

Thus, in the disk cartridge 1, the grip parts 6c and 6c are disposed on positions which do not expand between the first shell 3 and the second shell 4 and which are other than the project plane of the disk-shaped recording media 100, 100, . . . . Accordingly, high strength of the grip parts 6c and 6c is secured, and a load is hardly given to the disk-shaped recording media 100, 100, . . . which are housed, from the cartridge holding mechanism when the disk cartridge 1 is gripped by the cartridge holding mechanism. Consequently, data recorded in the disk-shaped recording media 100, 100, . . . can be favorably maintained.

Further, since the reinforcing part 10 and the auxiliary base 6 which serves as a reinforcing part are provided in the inside of the case body 2, the strength of the first shell 3 can be improved and damage or scratch of the case body 2 can be prevented.

Further, since the reinforcing part 10 and the auxiliary base 6 are provided to parts on which the grip parts 6c and 6c are provided, the strength of the grip parts 6c and 6c is increased and therefore data recorded in the disk-shaped recording media 100, 100, . . . can be further favorably maintained.

Furthermore, to the reinforcing part 10 and the auxiliary base 6, the plurality of partition walls 16, 16, . . . and the plurality of partition walls 6d, 6d, . . . which have a plurality of spaces are respectively provided.

Thus, the strength of the case body 2 can be improved with the simple configuration. In addition, the case body 2 has the plurality of spaces, so that the disk cartridge 1 is hardly submerged in water, and pick-up time can be prolonged in a case where the disk cartridge 1 floats on water. Further, effects of natural disasters such as wind and rain or floods and effects of wind and rain in transportation can be reduced. Sufficient buoyancy in a case where the disk cartridge 1 is fallen into water can be secured by setting the volume of the space in the inside of the disk cartridge 1 larger than the volume of water which has the same weight as the weight of the disk cartridge 1.

Further, since parts of the reinforcing part 10 and the auxiliary base 6 are formed respectively as the regulation parts 15b and 20b which regulate positions of the disk-shaped recording media 100, 100, . . . , the positions of the disk-shaped recording media 100, 100, . . . can be regulated with reduced number of elements and reduced manufacturing cost.

In addition, the pair of groove parts are formed as the grip parts 6c and 6c. Thus, the configuration of the grip parts 6c and 6c is simple and therefore manufacturing cost can be reduced. Further, since the grip parts 6c and 6c are not protruded outward, the size of the disk cartridge 1 can be reduced.

In the state that the first shell 3 and the second shell 4 are separated from each other as described above, the first shell 3 and the second shell 4 can be joined to each other by moving the second shell 4 upward in an approaching manner to the first shell 3, for example.

When the first shell 3 and the second shell 4 are joined to each other, the lock levers 21 and 21 are held on rotating positions on which the lock is released and the lock sliders 31 and 31 are held on moving positions on which the lock is released (refer to FIGS. 24 and 25).

When the second shell 4 is moved upward and contacts with the first shell 3 and the second shell 4 and the first shell 3 are moved rearward, pressing with respect to the insertion protrusion parts 27 and 27 of the lock-release parts 24 and 24 by the pressing parts 72b and 72b of the release pressing pieces 72 and 72 is released and the lock levers 21 and 21 are rotated by energizing force of the energizing springs 30 and 30. Accordingly, the locking protrusion parts 23a and 23a of the lock parts 23 and 23 are respectively inserted into and engaged with the first locking concave parts 45a and 45a of the second shell 4. Thus, the first shell 3 and the second shell 4 are locked by the lock levers 21 and 21.

Figure 27:
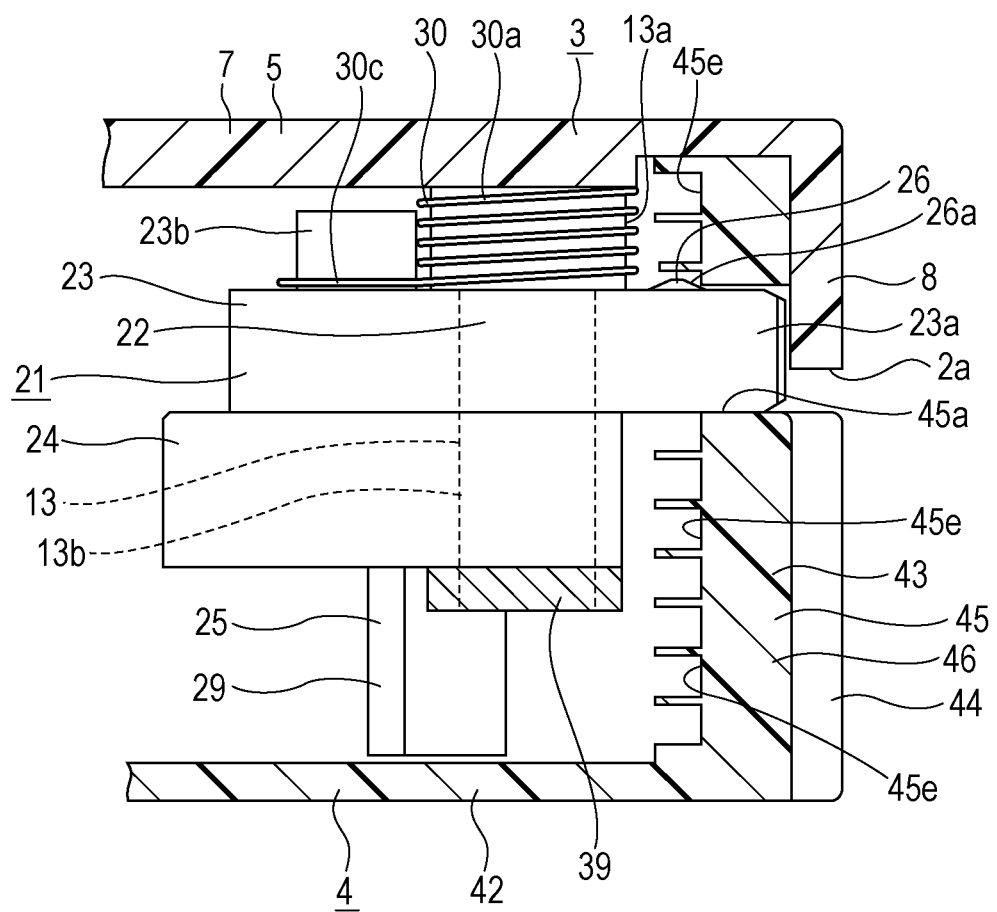
FIG. 27 is an enlarged sectional view showing a state immediately before the lock lever is rotated to join the first shell and the second shell.

At this time, since the protrusion part 26 is provided to the lock part 23 of the lock lever 21, the lock is performed while the slide contact face 26a of the protrusion part 26 slides and contacts with the opening edge of the first locking concave part 45a, as shown in FIG. 27. Accordingly, the second shell 4 is displaced upward and the first shell 3 is displaced downward. Thus, the first shell 3 and the second shell 4 are displaced in a direction, in which the first shell 3 and the second shell 4 approach each other, so as to be joined to each other. Thus, the protrusion part 26 of the lock lever 21 serves as a displacement mechanism.

When the first shell 3 and the second shell 4 are joined to each other as described above, the first shell 3 and the second shell 4 are displaced in the direction in which they approach each other by the protrusion part 26 which serves as the displacement mechanism, whereby air-tightness of the first shell 3 and the second shell 4 can be favorably secured.

Further, when the second shell 4 is moved upward to contact with the first shell 3 and the first shell 3 and the second shell 4 are moved rearward, pressing with respect to the supported parts 32 and 32 by the releasing parts 73b and 73b of the lock-release pieces 73 and 73 is released and thereby the lock sliders 31 and 31 are respectively moved frontward by energizing force of the coil springs 36 and 36. Accordingly, the lock parts 33 and 33 are respectively inserted into and engaged with the second locking concave parts 45b and 45b of the second shell 4. Thus, the first shell 3 and the second shell 4 are locked by the lock sliders 31 and 31.

Figure 28:
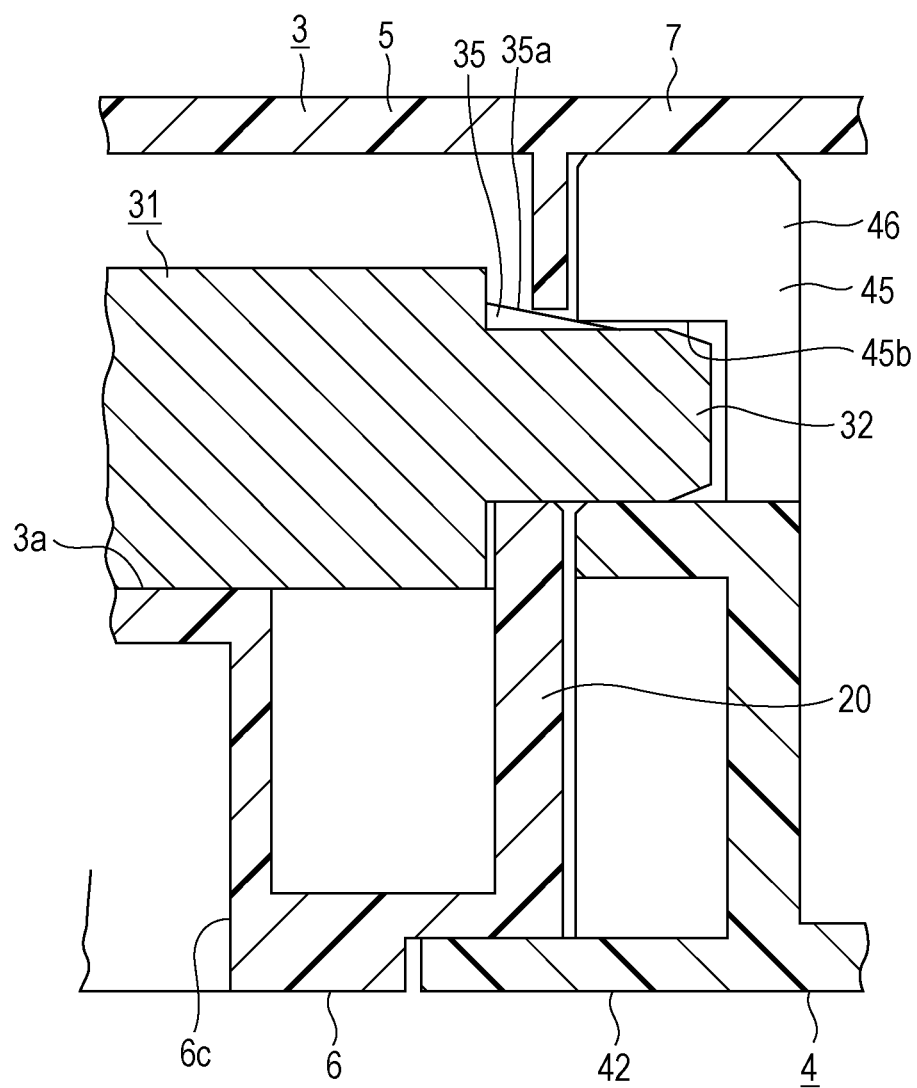
FIG. 28 is an enlarged sectional view showing a state immediately before the lock slider is moved to join the first shell and the second shell.

At this time, since the protrusion part 35 is provided to the lock part 33 of the lock slider 31, the lock is performed while the slide contact face 35a of the protrusion part 35 slides and contacts with the opening edge of the second locking concave part 45b, as shown in FIG. 28. Accordingly, the second shell 4 is displaced upward and the first shell 3 is displaced downward. Thus, the first shell 3 and the second shell 4 are displaced in the direction, in which the first shell 3 and the second shell 4 approach each other, so as to be joined to each other. Thus, the protrusion part 35 of the lock slider 31 serves as a displacement mechanism.

As described above, when the first shell 3 and the second shell 4 are joined to each other, the first shell 3 and the second shell 4 are displaced in the direction in which the first shell 3 and the second shell 4 approach each other by the protrusion part 35 which serves as the displacement mechanism. Accordingly, the air-tightness of the first shell 3 and the second shell 4 can be favorably secured.

In the state that the first shell 3 and the second shell 4 are joined to each other, the rear end part of the second shell 4 is disposed on the concave part 17a of the bottom face plate 17 of the first shell 3 and thereby the air-tightness of the first shell 3 and the second shell 4 is secured.

Further, the insertion parts 45f and 45f of the internal wall parts 45 and 45 of the second shell 4 are respectively inserted into the insertion concave parts 3b and 3b which are formed on positions on the side of the rear end of the first shell 3 and thus the first shell 3 and the second shell 4 are positioned.

As described above, the disk cartridge 1 includes the displacement mechanism that presses the first shell 3 to the second shell 4 and presses the second shell 4 to the first shell 3 when the first shell 3 and the second shell 4 are joined to each other.

Accordingly, in the joining state of the first shell 3 and the second shell 4, the air-tightness is favorably secured, dusts or moisture hardly enters the inside of the case body 2 from outside, and the storage condition of data recorded in the disk-shaped recording media 100, 100, . . . can be favorably secured.

Further, entry of foreign elements or moisture to the disk cartridge 1 in transportation of the disk cartridge 1 or in natural disasters can be prevented.

The disk cartridge 1 includes the protrusion parts 26 and 26 of the lock levers 21 and 21 and the protrusion parts 35 and 35 of the lock sliders 31 and 31 as the displacement mechanism described above.

Thus, the displacement mechanism has a simple configuration, so that the air-tightness of the first shell 3 and the second shell 4 can be favorably secured without increasing the manufacturing cost. Further, since the displacement mechanism is provided to the lock levers 21 and 21 and the lock sliders 31 and 31, the air-tightness can be favorably secured in the state that the first shell 3 and the second shell 4 are joined and locked to each other.

In the above description, the protrusion parts 26 and 26 of the lock levers 21 and 21 and the protrusion parts 35 and 35 of the lock sliders 31 and 31 are shown as the displacement mechanism. However, the displacement mechanism is not limited to these.

Figure 29:
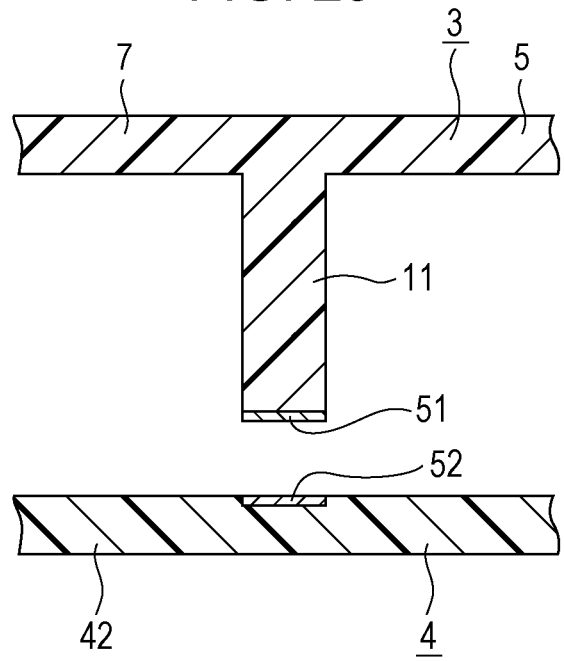
FIG. 29 is an enlarged sectional view showing an example that a magnet is attached to one of a center pin and the second shell and a magnetic material or a magnet is attached to the other.

For example, a magnet 51 may be disposed on one of the end part of the center pin 11 provided to the first shell 3 and the base plate 42 of the second shell 4 and a magnetic member 52 or a magnet may be provided on the other, as shown in FIG. 29. By such configuration, the magnet 51 and the magnetic member 52 or the magnet are stuck to each other and accordingly the favorable air-tightness of the first shell 3 and the second shell 4 can be secured.

Figure 30:
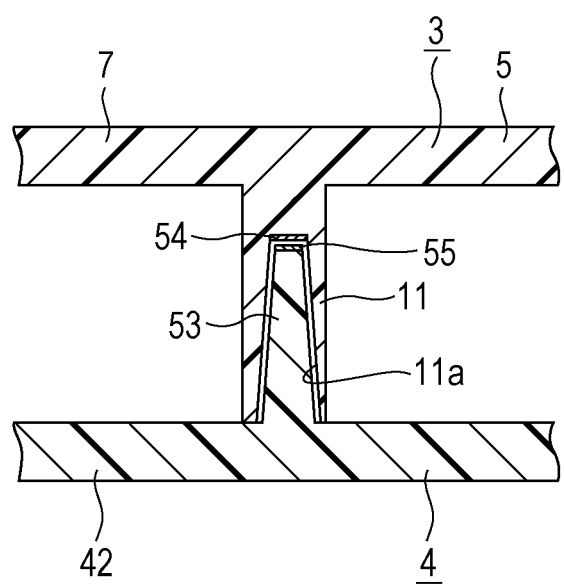
FIG. 30 is an enlarged sectional view showing an example that a magnet is attached to one of the center pin and an insertion pin which is provided to the second shell and a magnetic material or a magnet is attached to the other.

Alternatively, a disposition hole 11a may be formed in the center pin 11 which is provided to the first shell 3, an insertion pin 53 which is inserted into the disposition hole 11a may be provided to the second shell 4, a magnet 54 may be disposed on one of the disposition hole 11a and the insertion pin 53, and a magnetic member 55 or a magnet may be disposed on the other, for example, as shown in FIG. 30. By such configuration, the magnet 54 and the magnetic member 55 or the magnet are stuck to each other and accordingly the favorable air-tightness of the first shell 3 and the second shell 4 can be secured.

As described above, the displacement mechanism is simplified by using the magnets 51 and 54 and the magnetic members 52 and 55 or the magnet, as well. Accordingly, the favorable air-tightness of the first shell 3 and the second shell 4 can be secured without increasing the manufacturing cost. Further, since the center pin 11 serves as the displacement mechanism, the favorable air-tightness can be surely secured in the joining state of the first shell 3 and the second shell 4.

Here, the favorable air-tightness can be secured in the joining state of the first shell 3 and the second shell 4 also by using a tension coil spring which is held between the lower face of the base face 7 of the first shell 3 and the upper face of the base plate 42 of the second shell 4, as the displacement mechanism, for example.

Further, in the case where the displacement mechanism for securing the air-tightness of the first shell 3 and the second shell 4 is provided, such configuration is also applicable that one of the first shell 3 and the second shell 4 is displaced with respect to the other. In this case, such configuration that lighter one of the first shell 3 and the second shell 4 is displaced is desirable so as to reduce drive force in the displacement. There is a high possibility that the first shell 3 is lighter than the second shell 4 in the disk cartridge 1 because the disk-shaped recording media 100, 100, . . . are held at the holding grooves 45e, 45e, . . . of the second shell 4. Therefore, such configuration that the first shell 3 is displaced with respect to the second shell 4 is more desirable.

The present application contains subject matter related to that disclosed in Japanese Priority Patent Application JP 2010-119651 filed in the Japan Patent Office on May 25, 2010, the entire contents of which are hereby incorporated by reference.

It should be noted that the specific shapes and configurations of the respective elements described in the above-described embodiment are merely illustrative examples in embodying the present invention and the technical scope of the present invention should not be limitedly interpreted by these examples.

What is claimed is:

1. A disk cartridge comprising:
   a case body that is capable of housing a plurality of disk-shaped recording media in an inside thereof in a manner to arrange the disk-shaped recording media in an axial direction of a central axis, and that is joined or separated by making a first shell, the first shell including a base face that is parallel to a recording face of the disk-shaped recording media, in contact with or separate from a second shell, the second shell including a base plate that is parallel to the recording face of the disk-shaped recording media, in the axial direction; and
   a lock lever that is rotatably supported within a face orthogonal to the axial direction and locks the first shell and the second shell in a joining manner, in the inside of the case body; wherein
   a supporting shaft which serves as a rotation fulcrum of the lock lever is provided to the case body,
   the lock lever includes a supported part that is supported by the supporting shaft and a lock part that is protruded from the supported part and locks the first shell and the second shell,
   a disk inserting/ejecting slot, into or from which the disk-shaped recording media are inserted or ejected with respect to the case body formed when the first shell and the second shell are separated from each other,
   an open/close panel that opens/closes the disk inserting/ejecting slot is provided to the first shell,
   the lock lever is supported on an end part, the end part being at an open/close panel side, of the case body,
   an insertion concave part, in which the lock part of the lock lever can be inserted and engaged, is formed within an inner face of the open/close panel, and
   wherein the lock lever comprises a balance part, the balance part comprising:
   a protrusion part protruding from the supported part in a direction approximately opposite from a direction in which the lock part protrudes from the supported part; and
   a regulation protrusion part protruding upwardly and downwardly from an end part of the protrusion part.

2. The disk cartridge according to claim 1, wherein
   the lock lever is rotatably supported on the first shell,
   a pair of lateral faces that are orthogonal to the base plate is provided to the second shell, wherein the lateral faces are protruded from respective end parts of the base plate in a same direction as each other, and are positioned to be opposed to each other,
   a plurality of holding grooves into which each of outer circumferential parts of the disk-shaped recording media is inserted so that the disk-shaped recording media are held are formed within inner faces of the pair of lateral faces, and a locking concave part that is engaged with the lock part of the lock lever so as to lock the first shell and the second shell is formed on end parts, the end parts being at the open/close panel side, of the lateral faces.

3. The disk cartridge according to claim 2, wherein the supporting shaft is provided to be protruded from the base face of the first shell, an energizing spring to energize the lock lever in a rotating direction in which the lock part is engaged with the locking concave part is provided, a torsion coil spring that is composed of a coil part and a pair of arm parts, the pair of arm parts being stuck out from the coil part, is used as the energizing spring, a spring hook protrusion part on which one of the arm parts of the energizing spring is engaged and supported is provided on the base face of the first shell, a spring supporting protrusion part on which the other of the arm parts of the energizing spring is engaged and supported is provided on the lock lever, the spring supporting protrusion part is protruded toward the base face of the first shell from the lock part, and the coil part of the energizing spring is supported on an end part, the end part being at a base face side, of the supporting shaft.

4. The disk cartridge according to claim 1, wherein the open/close panel is provided with an attached protrusion part that is protruded from the inner face thereof, and the attached protrusion part is attached to one end part in an axial direction of the supporting shaft.

5. The disk cartridge according to claim 4, wherein the attached protrusion part of the open/close panel is positioned so as to be opposed to and close to the lock lever.

6. The disk cartridge according to claim 1, wherein the supporting shaft protrudes from the first shell.

7. The disk cartridge according to claim 1, wherein the lock part comprises an outer circumferential face formed in a circular-arc surface shape.

8. The disk cartridge of claim 7, wherein the circular-arc surface shape of the outer circumferential face is centered on a central axis of the supported part.

9. The disk cartridge according to claim 1, wherein the regulation protrusion part comprises a regulation face which is formed in a circular-arc surface shape.

10. The disk cartridge according to claim 9, wherein the circular-arc surface shape of the regulation face follows an outer circumference of the at least one of the plurality of disk-shaped recording media when the at least one of the plurality of disk-shaped recording media is housed in the case body.

11. The disk cartridge according to claim 1, wherein the center of gravity of the lock lever is positioned in the vicinity of a central axis of the support part.

* * * * *